US009708792B2

(12) United States Patent
Hirayama et al.

(10) Patent No.: US 9,708,792 B2
(45) Date of Patent: Jul. 18, 2017

(54) CONSTRUCTION MACHINE HAVING COOLING FUNCTION

(71) Applicant: KOBELCO CONSTRUCTION MACHINERY CO., LTD., Hiroshima-shi (JP)

(72) Inventors: Michio Hirayama, Hiroshima (JP);
Seiichi Onishi, Hiroshima (JP);
Hidenori Matsunaga, Hiroshima (JP);
Hideki Hayashi, Hiroshima (JP);
Atsushi Hirahara, Hiroshima (JP);
Ayumu Tokuda, Hiroshima (JP);
Shigeyuki Oda, Hiroshima (JP);
Shinichiro Amano, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 0 days.

(21) Appl. No.: 15/138,446

(22) Filed: Apr. 26, 2016

(65) Prior Publication Data

US 2016/0312437 A1    Oct. 27, 2016

(30) Foreign Application Priority Data

Apr. 27, 2015   (JP) .................................. 2015-090090
Oct. 14, 2015   (JP) .................................. 2015-203129

(51) Int. Cl.
*B60K 11/02*      (2006.01)
*E02F 9/08*       (2006.01)
(Continued)

(52) U.S. Cl.
CPC ............ *E02F 9/0866* (2013.01); *B60K 11/02* (2013.01); *B60K 11/085* (2013.01); *E02F 3/32* (2013.01)

(58) Field of Classification Search
CPC ........ E02F 9/0866; E02F 3/325; B60K 11/04; B60K 11/02; B60K 11/085
See application file for complete search history.

(56) References Cited

U.S. PATENT DOCUMENTS 7,204,329 B2 *  4/2007  Pfohl ..................... B60K 11/04
                                                 180/68.1
8,251,434 B2 *  8/2012  Hall ....................... B60J 5/0434
                                                 296/146.7

(Continued)

FOREIGN PATENT DOCUMENTS

JP        4-82318 U      7/1992
JP        2008-37343     2/2008

*Primary Examiner* — Hau Phan
(74) *Attorney, Agent, or Firm* — Oblon, McClelland, Maier & Neustadt, L.L.P.

(57) ABSTRACT

Provided is a construction machine capable of suppressing overcooling of fluid by heat exchangers, while requiring only a small space. The construction machine includes: a lower travel body; an upper slewing body mounted on the lower travel body and having an engine compartment; an engine compartment cover covering the engine compartment; an air filter which collects dust in outside air taken into the engine compartment and has a filter surface; a heat exchanger disposed downstream of the air filter in an air flow direction and having a core surface; an air filter holding section holding the air filter removably in an attitude opposing the filter surface of the air filter to the core surface of the heat exchanger; and a shut member installed removably on the air filter to shut at least a part of the filter surface.

9 Claims, 21 Drawing Sheets

(51) Int. Cl.
*B60K 11/08* (2006.01)
*E02F 3/32* (2006.01)

(56) References Cited

U.S. PATENT DOCUMENTS

| | | | | |
|---|---|---|---|---|
| 8,430,450 B2* | 4/2013 | Stephens | ............. | B60H 3/0616 |
| | | | | 296/190.09 |
| 8,591,206 B2* | 11/2013 | Krenik | ................... | F25B 9/004 |
| | | | | 310/309 |
| 8,651,219 B2* | 2/2014 | Yoshida | ................. | E02F 3/325 |
| | | | | 180/305 |
| 8,936,127 B2* | 1/2015 | Kanamaru | ............ | E02F 9/0866 |
| | | | | 180/69.21 |
| 8,945,259 B2* | 2/2015 | Watanabe | .......... | B01D 46/0005 |
| | | | | 123/198 E |
| 8,967,309 B2* | 3/2015 | Kimura | ............. | B60H 1/00378 |
| | | | | 180/68.1 |
| 2012/0234513 A1* | 9/2012 | Watanabe | ............. | B60K 11/04 |
| | | | | 165/41 |

* cited by examiner

CONSTRUCTION MACHINE HAVING COOLING FUNCTION

TECHNICAL FIELD

The present invention relates to a construction machine such as a hydraulic excavator, or the like, having a cooling function.

BACKGROUND ART

A construction machine generally has a function of cooling fluid, which is a cooling object, such as engine cooling water or hydraulic oil. Specifically, a construction machine is provided with a radiator and/or oil cooler for exchanging heat between the cooling water and/or hydraulic oil and the outside air. Such a construction machine involves a risk of overcooling of the cooling water and hydraulic oil in the case of the operation under cold conditions where the outside air temperature is low (for example, below freezing point).

Conventionally known is a construction machine provided with means for adjusting the flow rate of cooling air flow passing through the radiator or oil cooler, as described in Japanese Unexamined Patent Publication No. 2008-37343 (Patent Document 1) and Japanese Utility Model application Publication No. H4-82318 (Patent Document 2).

Patent Document 1 discloses a construction machine including a radiator with an opening, a louver installed on the radiator so as to be able to open and close the opening, and a radiator grille device having a drive means for driving the louver in the open/close direction. The louver is held in a close position when at least one of the water temperature and oil temperature is lower than respective set temperatures for them, and is shifted to an open position when both of the water temperature and the oil temperature are higher than the respective set temperatures.

Patent Document 2 discloses a construction machine provided with a shut device having a plurality of vanes which can be opened and closed so as to switch between a fully-open state and a fully-closed state, and a cylinder which moves each of the plurality of vanes. The vanes of the shut device are opened and closed in accordance with the cooling water temperature of the engine, thereby change the flow rate passing through the radiator.

The installation of the radiator grille device and/or the shut device, however, involves the increase in the size of the construction machine because of securing the space for the installation. Besides, for compactly slewing construction machines it is difficult to create space for the additional installation of the radiator grille devices and/or shut devices.

SUMMARY OF INVENTION

The object of the present invention is to provide a construction machine including a heat exchanger for cooling fluid which is a cooling object and being capable of suppressing overcooling of the fluid with only a small space requirement. Provided is a construction machine including: a lower travel body; an upper slewing body mounted on the lower travel body and having an engine compartment; an engine compartment cover which covers the engine compartment of the upper slewing body; an air filter which collects dust included in outside air taken into the engine compartment and which has a filter surface; at least one heat exchanger disposed downstream of the air filter in an air flow direction and having a core surface; an air filter holding section which holds the air filter removably in an attitude which opposes the filter surface of the air filter to the core surface of the at least one heat exchanger; and a shut member which is installed removably on the air filter to shut at least a part of the filter surface of the air filter.

DESCRIPTION OF EMBODIMENTS

Embodiments of this invention are described below with reference to the drawings. The description of the desirable embodiments given below merely shows examples and the present invention is not limited to these applications.

Figure 1:
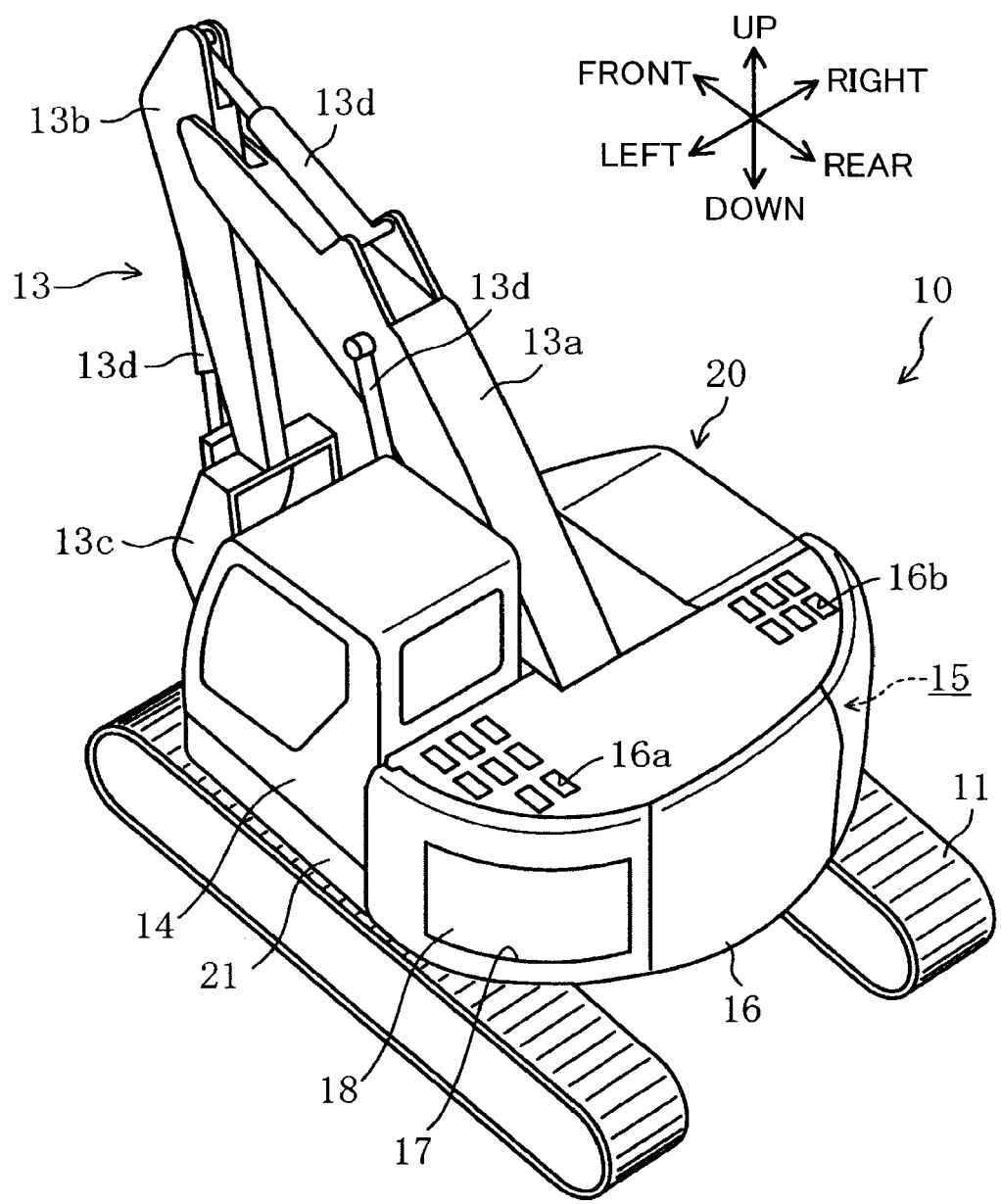
FIG. 1 is a perspective diagram showing the overall configuration of a construction machine relating to a first embodiment of the present invention.

FIG. 1 is a perspective diagram showing the overall configuration of a construction machine 10 relating to a first embodiment of the present invention. FIG. 1 includes respective arrows showing the up/down, front/rear and right-left directions.

The construction machine 10 is provided with a crawler-type lower travel body 11, and an upper slewing body 20 mounted slewably on the lower travel body 11. The upper slewing body 20 includes an attachment 13, a cab 14, an engine compartment 15, and an upper frame 21. The construction machine 10 shown in FIG. 1 is a compactly slewing type of hydraulic excavator, having a rear part with circular arc-shaped outline profile when viewed from above, so as to have a small slewing radius.

The attachment 13 is disposed in the front part of the upper slewing body 20, including a boom 13a, an arm 13b and a bucket 13c. The boom 13a, the arm 13b and the bucket 13c make their respective rotational movements in synchronization with respective extensions and contractions of hydraulic cylinders 13d, 13e, 13f to thereby perform excavating and the like.

Operations for the attachment 13 are applied in the cab 14. The cab 14 is, for example, installed on the left front part of the upper slewing body 20, adjacently to the attachment 13.

The engine compartment 15 is provided in the rear part of the upper slewing body 20. The periphery of the engine compartment 15 is covered with an engine compartment cover 16. Inside the engine compartment 15 is tightly housed an engine 35 show in FIG. 2, an air filter 50 and a plurality of other devices. The engine compartment cover 16 has a portion covering the rear part of the engine compartment 15, the portion being formed by a counterweight.

The engine compartment cover 16 is formed with a maintenance hole 17 in the left rear part thereof. The engine compartment cover 16 is attached with an open/close door 18 capable of opening and closing the maintenance hole 17. The maintenance hole 17 is an opening for carrying out maintenance of the various devices provided inside the engine compartment 15, allowing the air filter 50 to be taken out rearward of the upper slewing body 20 from the engine compartment cover 16 and replaced through the maintenance hole 17.

Figure 2:
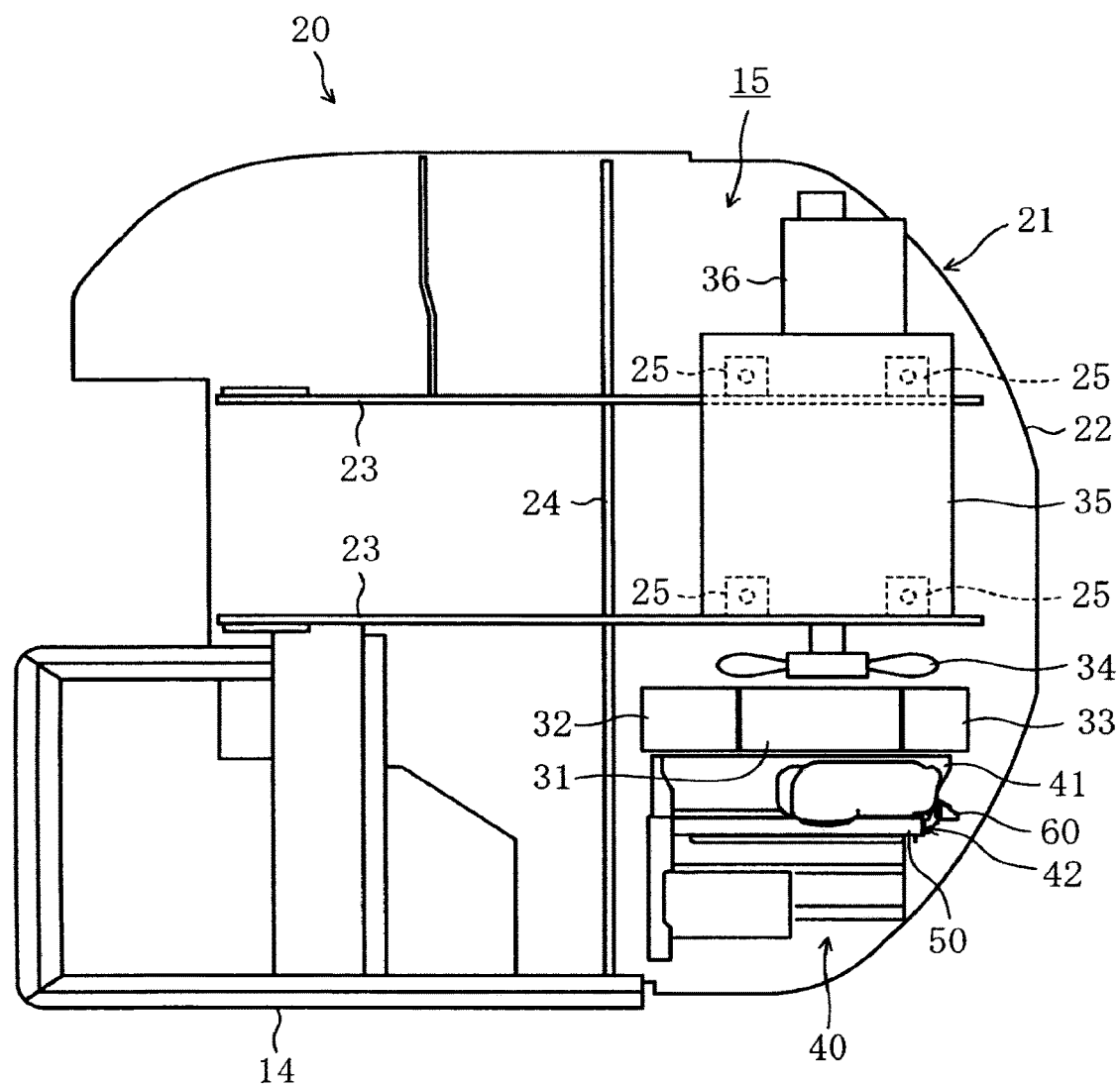
FIG. 2 is a plan diagram showing the interior of an upper slewing body of the construction machine.

As shown in FIG. 2, the upper frame 21 forms the lower part of the upper slewing body 20, and the cab 14 and the engine compartment 15, etc. are installed thereon. The upper frame 21 includes a bottom plate 22, a pair of longitudinal plates 23, a lateral beam 24 and a seat 25 for the engine 35.

The cab 14 is installed on the front left corner part of the bottom plate 22. The bottom plate 22 has a portion coupled to a not-graphically shown slewing mechanism, the portion located by front and midway widthwise of the bottom plate 22 is (not illustrated). The slewing mechanism supports the bottom plate 22 slewably above the lower travel body 11.

The pair of longitudinal plates 23 extend longitudinally, that is, in the front-rear direction, of the upper slewing body 20 in parallel to each other, from the front end portion to the rear end portion of the bottom plate 22, on the laterally and widthwise intermediate portion of the bottom plate 22. The pair of longitudinal plates 23 are welded to the bottom plate 22 so as to stand vertically on the bottom plate 22. The pair of longitudinal plates 23 receive the boom 13a of the attachment 13 therebetween and support the boom 13a rotatably. The seat 25 is mounted on the pair of longitudinal plates 23. The lateral beam 24 extends widthwise of the bottom plate 22 from the left end portion to the right end portion of the bottom plate 22, in the longitudinally intermediate portion of the bottom plate 22 in the front-rear direction, and is joined integrally with the bottom plate 22 and the longitudinal plates 23.

Figure 3:
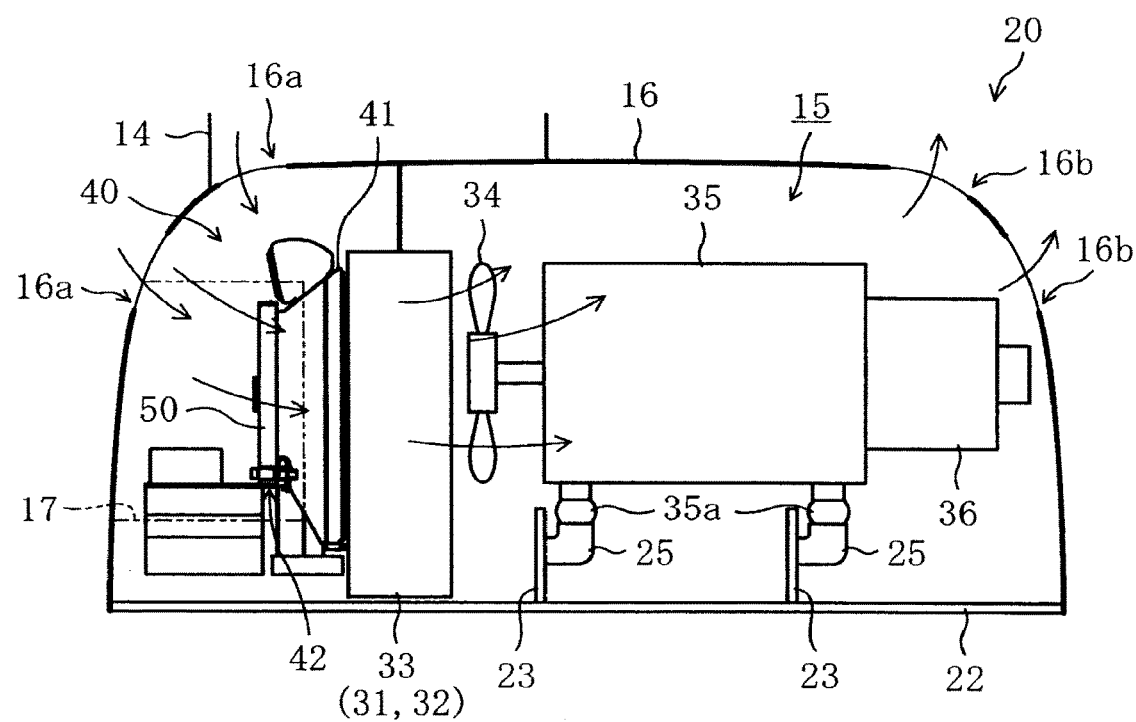
FIG. 3 is a rear view diagram showing the interior of an upper slewing body of the construction machine.

As shown in FIG. 3, the engine 35 is installed on the seat 25 via an anti-vibration member 35a. The engine 35 has a drive shaft, accommodated in the engine compartment 15 so as to direct the drive shaft laterally of the bottom plate 22. The engine compartment cover 16 is formed with an air intake port 16a for taking outside air into the engine compartment 15, in the upper left portion of the engine compartment cover 16. The engine compartment cover 16 is formed with an exhaust port 16b for discharging the outside air that had been taken, in the upper right part of the engine compartment cover 16.

The plurality of devices accommodated in the engine compartment 15 includes a hydraulic pump 36, first to third heat exchangers 31, 32, 33 aligned longitudinally, that is, in the front-rear direction, of the upper slewing body 20, a fan 34, and an air intake duct 40. In the construction machine 10 according to this embodiment, the air intake duct 40, the first to third heat exchangers 31, 32, 33, the fan 34, the engine 35, and the hydraulic pump 36 are arranged laterally, in this order from the upstream side with respect to the direction of air flow.

The first to third heat exchangers 31, 32, 33, each having a front shape of vertically-long rectangular, are arranged in parallel so as to be aligned widthwise. Each of first to third heat exchangers 31, 32, 33 has a core surface, disposed so as to make the core surface face widthwise of the upper slewing body 20. Here, the "core surface" is a surface corresponding to the outside air intake port for taking into the heat exchanger the outside air that has been taken inside the engine compartment through the port. The first to third heat exchangers 31, 32, 33 are therefore arranged so as to be aligned longitudinally of the upper slewing body 20. The first heat exchanger 31 is a radiator for cooling the engine cooling water, configured to exchange heat between the cooling water flowing into the first heat exchanger 31 and the outside air having been taken in through the air intake port 16a. The second heat exchanger 32 is an oil cooler for cooling the hydraulic oil, disposed forward of the first heat exchanger 31 with respect to the front-rear direction of the upper slewing body 20. The second heat exchanger 32 is configured to exchange heat between the hydraulic oil flowing into the second heat exchanger 32 and outside air taken in through the intake port 16a. The third heat exchanger 33 is an oil cooler for the turbo charger, disposed rearward of the first heat exchanger 31 with respect to the longitudinal direction of the upper slewing body 20. The third heat exchanger 33 is configured to exchange heat between compressed air having been compressed by a not-graphically-shown supercharger and outside air taken in through the intake port 16a.

The fan 34 is disposed between the engine 35 and the first to third heat exchangers 31, 32, 33, connected to the left end part of the drive shaft of the engine 35. The hydraulic pump 36 is disposed in the right-side portion of the engine compartment 15 and connected to the right end portion of the drive shaft of the engine 35. The fan 34 is rotated by the engine 35 to thereby suck outside air into the engine compartment 15 through the intake port 16a and causes the sucked air to flow inside the engine compartment 15 as cooling air. The cooling air sucked by the fan 34 passes through the first to third heat exchangers 31, 32, 33 to absorb heat from the cooling water and the hydraulic oil, thereby cooling same. The cooling air having made the heat exchange also cools the engine 35 and the like, thereafter released outside the engine compartment 15 through the exhaust port 16b, as hot wind. Specifically, the construction machine 10 allows, as indicated by the arrow in FIG. 3, flow of air from the left-side to the right-side inside the engine compartment 15 to be generated when the engine 35 is running.

Figure 4:
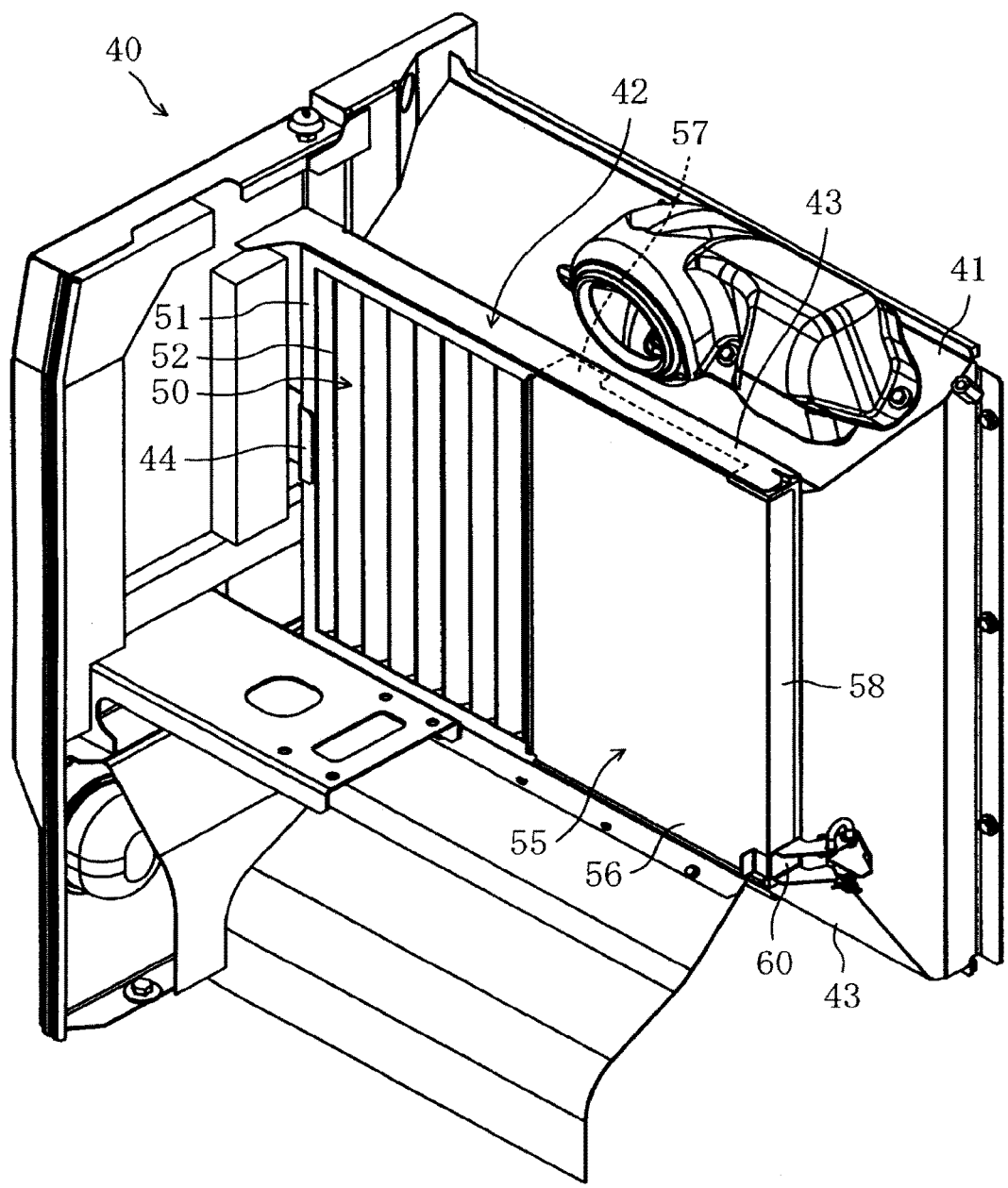
FIG. 4 is a perspective diagram showing a structure for installing an air filter which is mounted in the upper slewing body.

The intake duct 40 has a duct main body 41 as shown in FIG. 4. The duct main body 41 has a box shape opened in the direction from the upstream side to the downstream side of the air flow. The duct main body 41 has an air filter holding section 42 configured to hold the air filter 50 removably. The air filter 50 has a filter surface, and the air filter holding section 42 holds the air filter 50 removably, in such an attitude that the filter surface is opposed to the core surfaces of the first to third heat exchangers 31, 32, 33.

Figure 8:
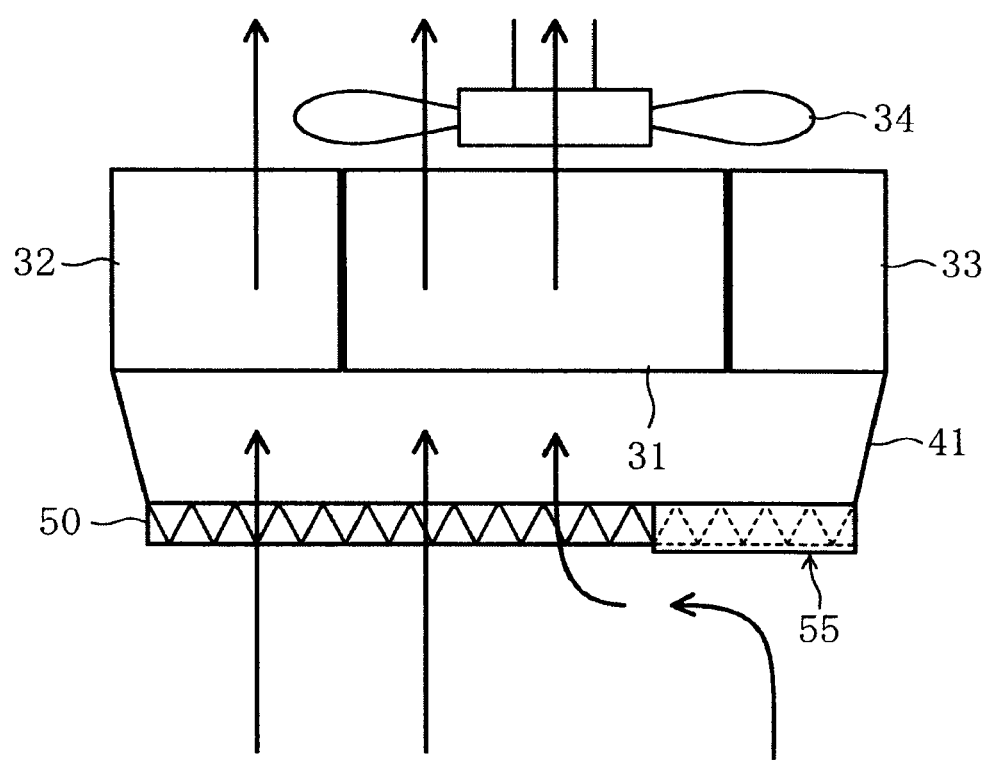
FIG. 8 is a plan diagram showing the positional relationship between the air filter and the shut member.

The air filter 50, which collects dust contained in the outside air taken inside the engine compartment 15, includes a filter frame 51 having a front shape of horizontally-long rectangular and a filter section 52 disposed inside the filter frame 51 to capture dust. Here, the "filter surface" is a surface which inhibits dust contained in the outside air having been taken into the engine compartment from passing through, while permitting cleaned air to pass through. The air filter 50 is disposed so as to direct the filter surface of the filter section 52 widthwise of the upper slewing body 20. The filter section 52 is formed of a sheet having been bent in a zig-zag shape widthwise of the upper slewing body 20, having a bellows shape, as shown in FIG. 8, in plan view, including a plurality of triangular shapes continuously aligned widthwise of the air filter 50 (the front-rear direction of the slewing body 20).

The air filter holding section 42 is provided in the upstream opening of the duct main body 41, and the air filter 50 is attached removably to the air filter holding section 42. Specifically, the air filter holding section 42 includes a pair of guide plates 43 disposed along the upper and under surfaces of the air filter 50, respectively, a sandwiching plate (sandwiching member) 44 disposed on the front side longitudinally of the upper slewing body 20, and a lock member 60 disposed on the rear side longitudinally of the upper slewing body 20.

The pair of guide plates 43 create a space for accommodating the air filter 50 therebetween. The pair of guide plates 43 function as a guide for the air filter 50 passing through the maintenance hole 17 of the engine compartment cover 16. Each of the guide plates 43 has an L-shaped cross-section composed of a horizontal main plate portion and a projecting plate portion projecting towards the filter section 52 from the downstream side end of the main plate portion. The projecting plate portion restrains the air filter 50 from movement towards the heat exchanger.

The sandwiching plate 44 has a main plate portion and a projecting plate portion. The main plate portion has a surface facing in the direction of the insertion of the air filter 50, in other words, in the front-rear direction of the upper slewing body 20, configured to make contact with the side wall surface of the air filter 50 on the front side longitudinally of the upper slewing body 20 to thereby position the air filter 50 at the deep side with respect to the insertion of the air filter 50. The projecting plate portion projects from the left end of the main plate portion rearward with respect to the lateral direction of the upper slewing body 20, longitudinally of the upper slewing body 20, and makes contact with the left-side surface of the air filter 50 laterally of the upper slewing body 20 to thereby position the air filter 50 with respect to the thickness direction.

The lock member 60 is mounted on the duct main body 41 so as to be capable of rotational movement between a lock position and an unlock position. In the lock position, the lock member 60 makes contact with the side wall surface of the air filter 50 on the rear side longitudinally of the upper slewing body 20 to hold the air filter 50 in sandwich between the lock member 60 and the sandwiching plate 44. In the unlock position, the lock member 60 releases the air filter 50 from the sandwich to enable the air filter 50 to be removed. The specific composition of the lock member 60 is described hereinafter.

Working by the construction machine 10 under cold conditions where the temperature of outside air is below freezing point may involve overcooling of the coolant which exchanges heat with the outside air in the first to third heat exchangers 31, 32, 33, namely, the cooling water of the radiator, the hydraulic oil of the oil cooler, or the compressed air of the intercooler. To suppress the overcooling, the construction machine 10 relating to this embodiment includes shutting at least a part of the filter surface of the air filter 50 to enable the flow rate of outside air passing through the first to third heat exchangers 31, 32, 33 to be adjusted.

Figure 5:
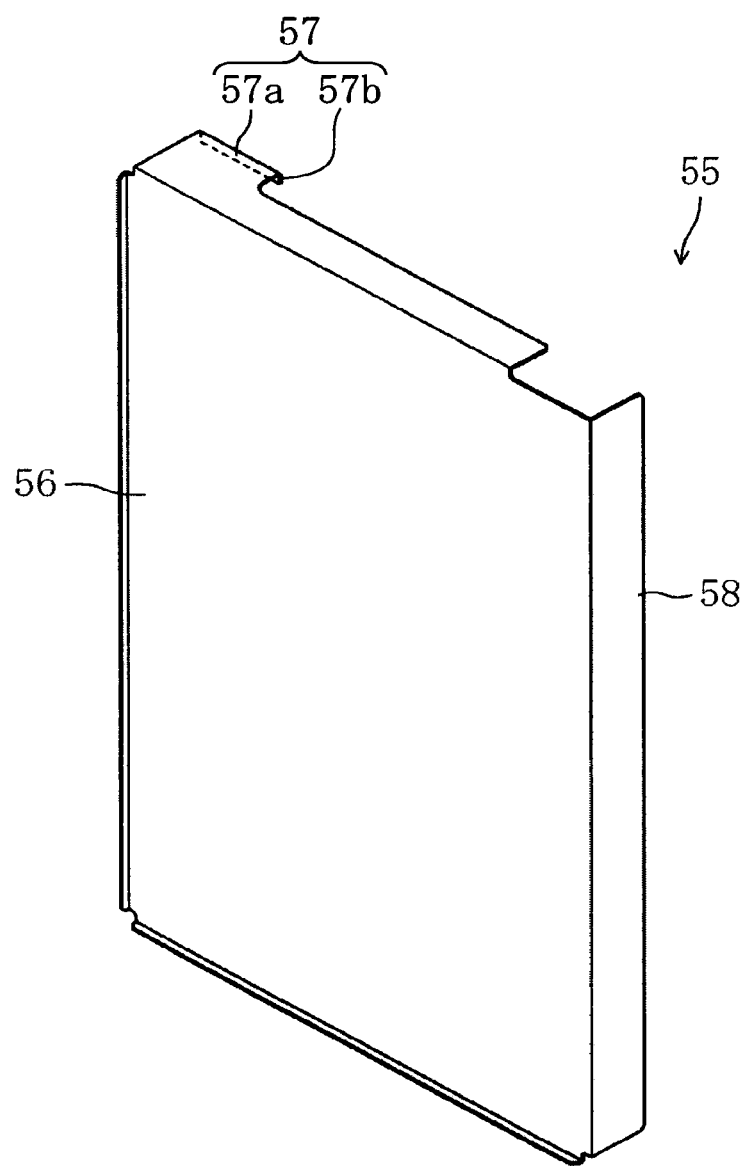
FIG. 5 is a perspective diagram of a shut member installed on the air filter.
Figure 6:
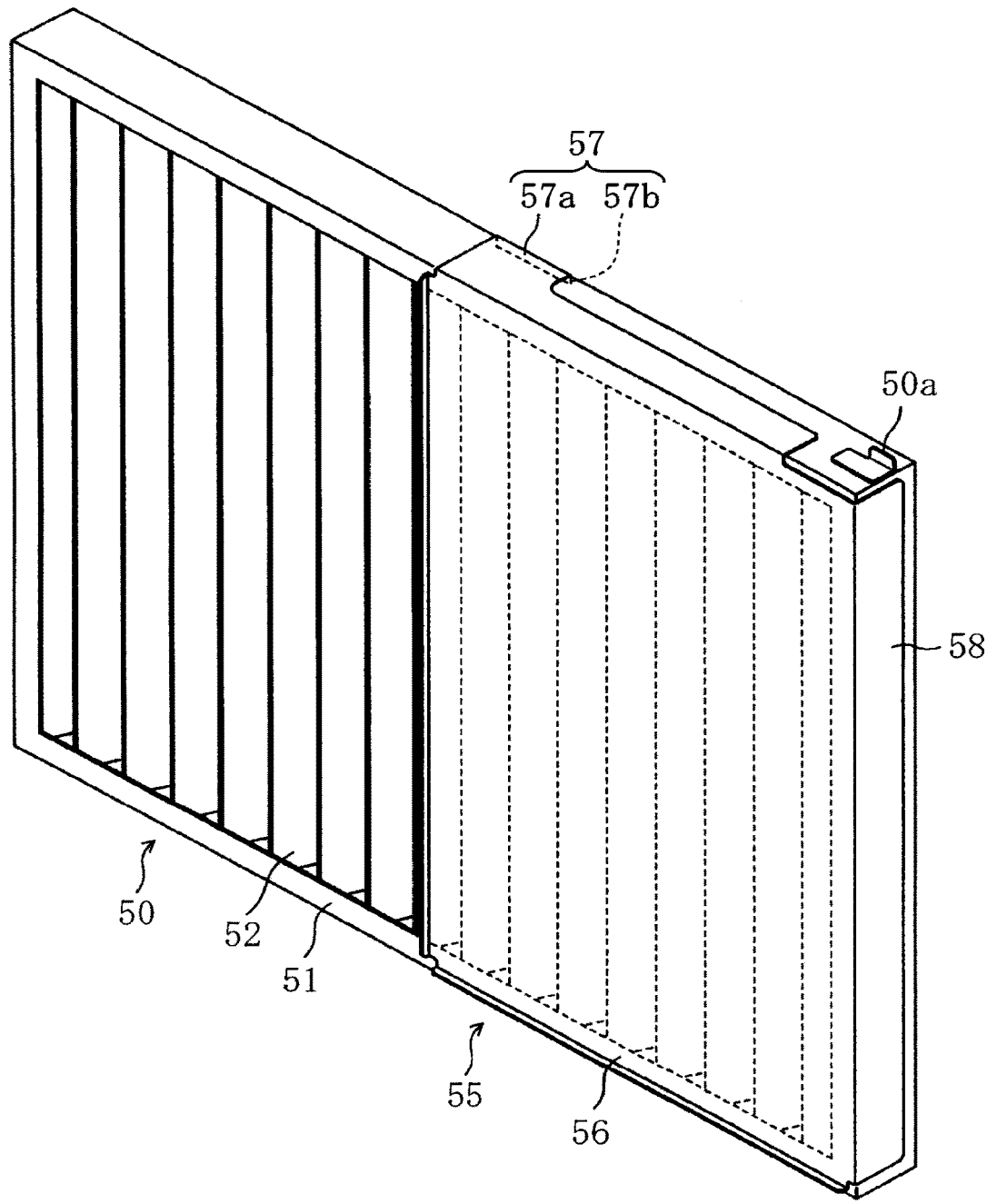
FIG. 6 is a perspective diagram showing a state where the shut member is installed on the air filter, as viewed from the upstream side in the air flow direction.
Figure 7:
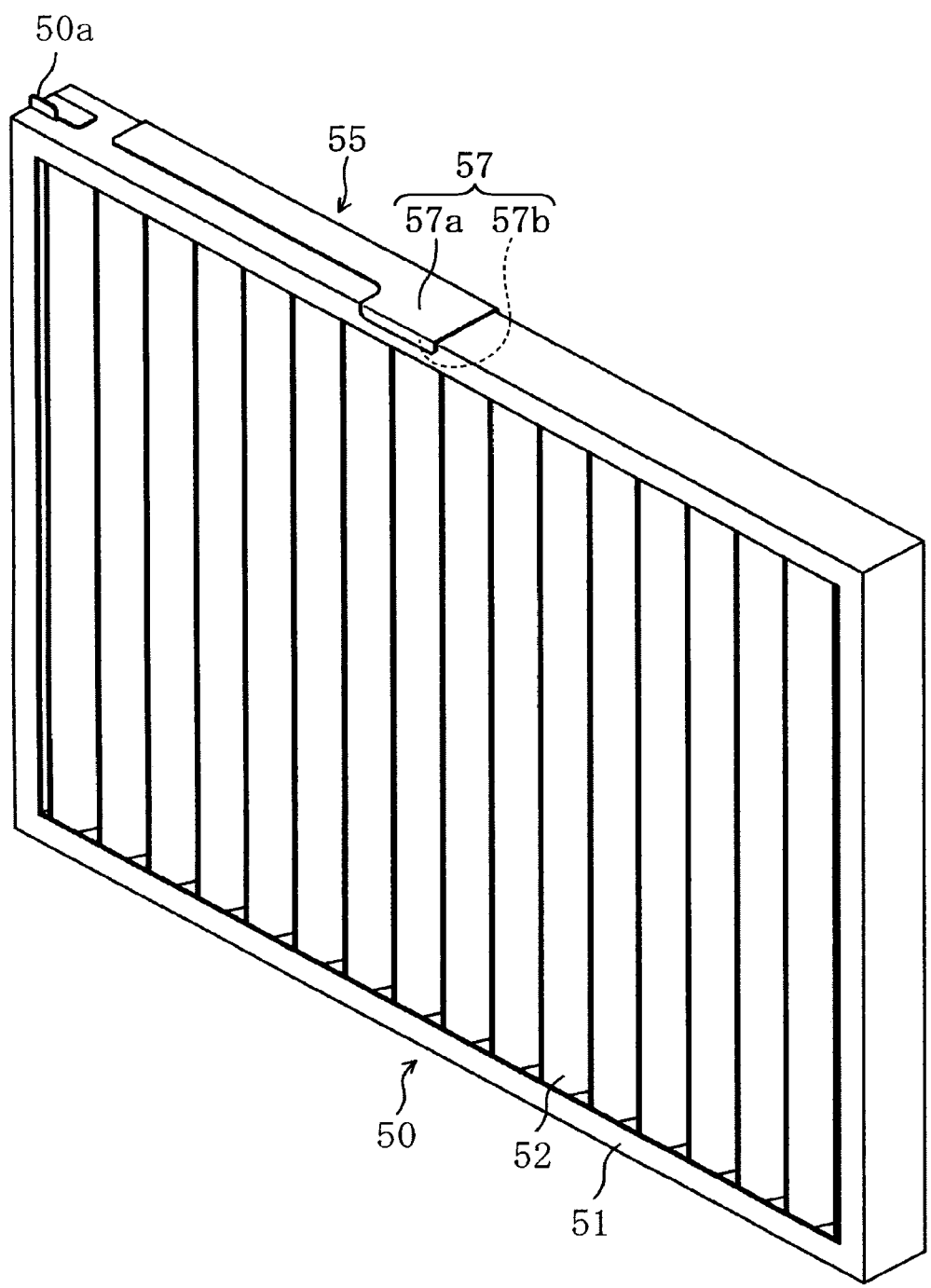
FIG. 7 is a perspective diagram showing a state where the shut member is installed on the air filter, as viewed from the downstream side in the air flow direction.

Specifically, as shown in FIG. 5 to FIG. 7, the construction machine 10 further includes a shut member 55 mounted removably on the air filter 50. The shut member 55 has a shut section 56 of a plate shape capable of shutting at least a part of the filter surface of the air filter 50, an engagement section 57 integrally joined with the upper edge portion of the shut section 56, and a contact section 58 integrally joined with the side edge portion of the shut section 56 on the rear side longitudinally of the upper stewing body 20.

The shut section 56 is disposed upstream of the air filter 50 with respect to the air flow direction, and has a vertical dimension that allows the shut section 56 to make contact with both the upper end and the lower end of the filter frame 51 of the air filter 50. The contact enables the shut section 56 to be pressed against the air filter 50 by the outside air flowing towards the air filter 50 to thus make tight contact with the filter frame 51.

The shut section 56 in this embodiment extends longitudinally, i.e., in the front-rear direction, of the upper slewing body 20 so as to overlap with the whole core surface of the third heat exchanger 33 of the intercooler and a part of the core surface of the first heat exchanger 31 of the radiator when viewed in the air flow direction as shown in FIG. 8. This reduces the flow rate of outside air toward the third heat exchanger 33 of the intercooler to thereby enable the compressed air in the third heat exchanger 33 to be restrained from overcooling even in cold conditions.

The engagement section 57 has a horizontal main plate portion 57a projecting from the upper edge of the shut section 56 to the right side laterally, i.e., in the right-left direction, of the upper slewing body 20 and a projecting plate portion 57b projecting downward from the end of the main plate portion, thus having a recess-shaped cross-section opened downward. The main plate portion 57a of the engagement section 57 has substantially the same dimension as the thickness of the filter frame 51 of the air filter 50, the dimension enabling the engagement section 57 to be fitted with the upper edge of the filter frame 51 of the air filter 50.

The shape of the engagement section 57 makes it possible to engage the engagement section 57 with the air filter 50 which has been removed for maintenance, for additionally installing the shut member 55 to an existing part of the construction machine 10, only by hooking the engagement section 57 onto the upper edge of the filter frame 51 of the air filter 50 and the engagement section 57. This eliminates the need for additional tasks, such as formation of screw holes in the air filter 50, and facilitates the word for installation of the shut member. Besides, it involves no need for creating special space for the installation of the shut member 55 inside the engine compartment 15.

The contact section 58, projecting from the side edge portion of the shut section 56 on the rear side in the front-rear direction of the upper slewing body 20 to the right side with respect to the right-left direction of the upper slewing body 20, is capable of making contact with the side wall surface of the filter frame 51 of the air filter 50 on the rear side laterally of the upper slewing body 20, that is, the wall surface perpendicular to the upper surface of the filter frame 51, namely, the engagement surface with which the engagement section 57 is engaged, thereby restricting the shut member 55 from displacement frontward in the front-rear direction of the upper slewing body 20 along the width direction of the air filter 50. The contact section 58, thus, enables the shut member 55 to be positioned relatively to the air filter 50.

As shown in FIG. 4, the air filter 50 can be received between the pair of guide plates 43 in the state where the shut member 55 has been installed removably on the air filter 50; this causes the horizontal main body portion of the engagement section 57 to be sandwiched between the upper guide plate 43 and the filter frame 51 of the air filter 50. Moreover, the lock member 60 in the lock position holds the contact section 58 together with the air filter 50 so as to sandwich them between the sandwiching plate 44 and the lock member 60. These suppress rattle of the shut member 55 to thereby eliminate necessity of additionally providing a fixing tool for fixing the shut member 55 to the air filter 50.

Figure 9:
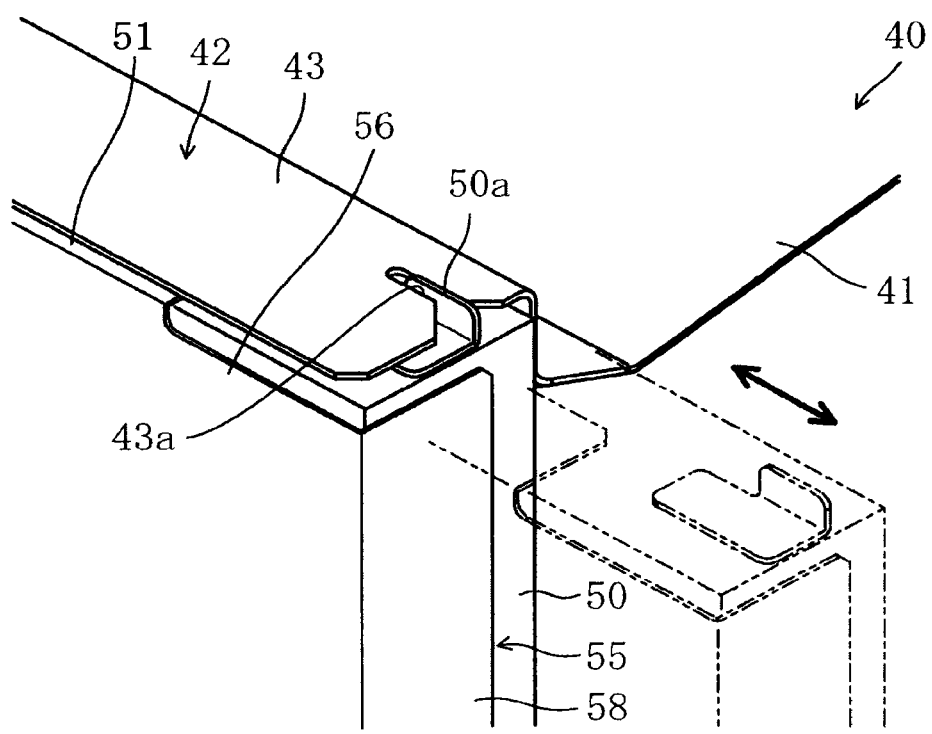
FIG. 9 is a perspective diagram showing a projecting plate of the air filter.

As shown in FIG. 9, the upper-side guide plate 43*a* is formed with a cutaway hole 43*a* opened rearward in the front-rear direction of the upper slewing body 20. The air filter 50 includes a projection plate 50*a* projecting upwards from the upper surface of the filter frame 51. The projection plate 50*a* is inserted into the cutaway hole 43*a* in the guide plate 43 and fits with the guide plate 43, involved by the insertion of the air filter 50 between the pair of guide plates 43, thereby positioning the air filter 50 in the thickness direction of the air filter 50.

Figure 10:
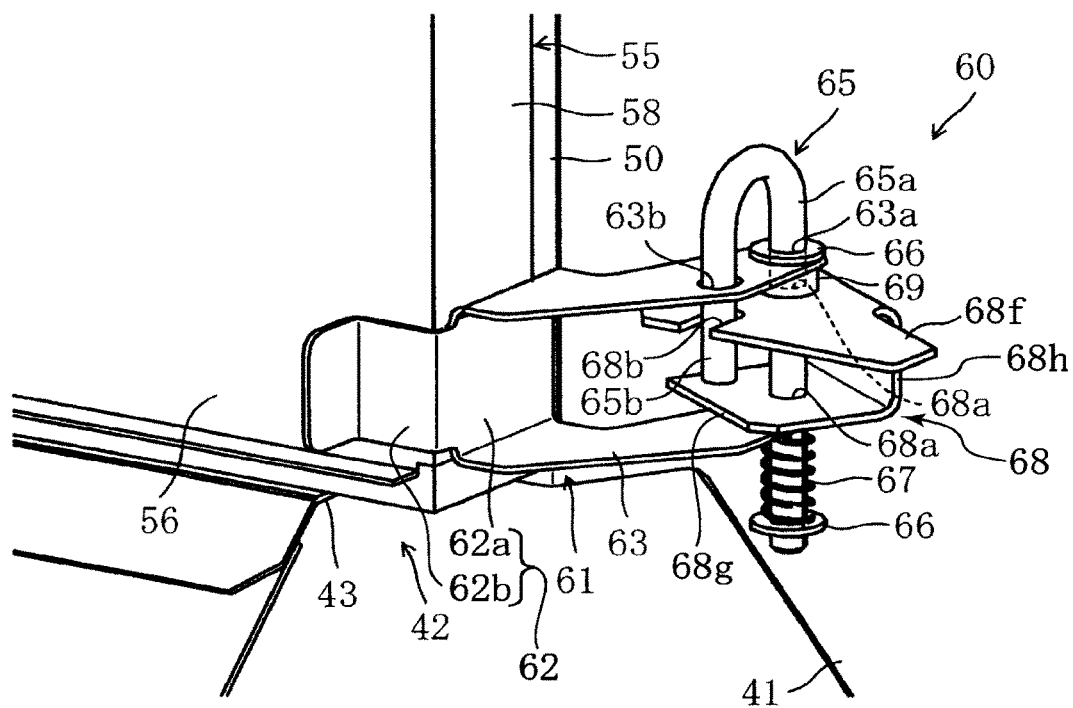
FIG. 10 is a perspective diagram showing a state where a lock member of an air filter holding section which holds the air filter is in a lock position.

FIG. 10 shows a state of the lock member 60 in the lock position. The lock member 60 includes a movable member 61 configured to make contact with the air filter 50 in the lock position, a shaft member 65 forming the rotational axis of the movable member 61, and a retention member 68 which retains the shaft member 65.

The movable member 61 has a lock plate 62 and a pair of upper and lower arm plates 63 formed integrally with the lock plate 62, the lock plate 62 including a base plate portion 62*a* contactable with the side wall surface of the air filter 50 on the rear side longitudinally of the upper slewing body 20 and a projecting plate portion 62*b* projecting from the end of the base plate portion 62*a* to be contactable with the upstream surface of the air filter 50 with respect to the air flow direction. The lock plate 62 and the pair of arm plates 63 are formed of a single bent plate member. Specifically, the arm plates 63 extend outwards from respective upper and lower edges of the base plate portion 62*a* of the lock plate 62.

The lock plate 62 makes contact with the side wall surface of the air filter 50 on the rear side in the front-rear direction of the upper slewing body 20 and the upstream surface thereof in the air flow direction to thereby fix the air filter 50 so as to sandwich it between the lock plate 62 and the sandwiching plate 44. The shaft member 65 has a center shaft portion 65*a* and an engagement shaft portion 65*b* which are parallel to each other. The lock plate 62 is capable of rotational movement about the center shaft portion 65*a* together with the arm plate 63 to thereby move between the lock position for fixing the air filter 50 and the unlock position for releasing the lock of the air filter 50.

Each of the arm plates 63 has a center-shaft insertion hole 63*a* which allows the center shaft portion 65*a* to be vertically inserted through the center-shaft insertion hole 63*a* and an engagement-shaft insertion hole 63*b* which allows the engagement shaft portion 65*b* to be vertically inserted through the engagement-shaft insertion hole 63*b*. The center shaft insertion hole 63*a* passes through both the arm plates 63 vertically, and the engagement shaft insertion hole 63*b* is formed in the upper-side arm plate 63.

The lock member 60 further includes the retention member 68 and a spacer member 69. The retention member 68 is disposed between the pair of arm plates 63, and the spacer member 69 is disposed between the upper-side arm plate 63 and the upper surface of the retention member 68.

The shaft member 65, which is formed of a single bent shaft member, includes the center shaft portion 65*a*, the engagement shaft portion 65*b* and an intermediate portion 65*c*. The center shaft portion 65*a* forms the rotational axis of the movable member 61. The engagement shaft portion 65*b* extends vertically in parallel to the center shaft portion 65*a*. The intermediate portion 65*c* is a portion coupling the upper end of the center shaft portion 65*a* and the upper end of the engagement shaft portion 65*b*, having an inverted U-shape, for example. The center shaft portion 65*a* has a total length greater than that of the engagement shaft portion 65*b*.

The lock member 60 further includes a pair of upper and lower stopper plates 66 as shown in FIG. 10 and a compression spring 67. The pair of stopper plates 66 are mounted on the center shaft portion 65*a* and located under the upper arm plate 63 and over the lower arm plate 63, respectively. The compression spring 67 is held in compression between the lower-side stopper plate 66 and the lower surface of the arm plate 63 to thereby urge the center shaft portion 65*a* in a direction in which the upper-side stopper plate 66 makes contact with the upper surface of the arm plate 63, namely, downward.

The retention member 68 integrally includes a pair of horizontal lower and upper plate portions 68*f*, 68*g* and a vertical plate portion 68*h*. The horizontal plate portions 68*f*, 68*g* are intersection plate portions spaced in the axial direction of the center shaft portion 65*a*, that is, vertically, and extending in the direction intersecting the axial direction, horizontally in this embodiment. The vertical plate portion 68*h* is a coupling plate portion coupling respective ends of the horizontal plate portions 68*f*, 68*g*, in the axial direction, that is, vertically. The retention member 68 can be formed, for example, of a single plate member bent into a square U-shape.

Each of the horizontal plate portions 68*f*, 68*g* is formed with a retention hole 68*a* passing through them vertically, and the upper-side horizontal plate portion 68*f* is formed with an engagement hole 68*b* having a shape where the edge of the horizontal plate portion 68*f* is partly cut away. The holding hole 68*a* allows the center shaft portion 65*a* of the shaft member 65 to be inserted through the holding hole 68*a* movably in the axial direction. The axial movement of the center shaft portion 65*a* involves the axial movement of the engagement shaft portion 65*b* integrally with the center shaft portion 65*a*. Their respective movements enable the shaft portion 65*b* to make detachable engagement with respect to the engagement hole 68*b*.

Next will be described the procedure for locking or unlocking the lock member 60 with reference to FIG. 10 and FIG. 11. As shown in FIG. 10, the lock plate 62 of the movable member 61 in the lock position makes contact with the side wall surface of the air filter 50 on the rear side in the front-rear direction of the upper slewing body 20 and the upstream surface in the air flow direction, thereby holding the air filter 50 between the lock plate 62 and the sandwiching plate 44. Meanwhile, the contact section 58 of the shut member 55 is held together with the air filter 50 between the sandwiching plate 44 and the lock plate 62.

In the lock position, the engagement shaft portion 65b of the shaft member 65 is engaged with the engagement hole 68b in the retention member 68 to thereby restrict the movable member 61 from rotational movement. Meanwhile, the elastic force of the compression spring 67 urges the shaft member 65 including the engagement shaft portion 65b downward to thereby prevent the engagement shaft portion 65b from unintentional removal from the engagement hole 68b. This makes it possible to install the air filter 50 on the air filter holding section 42 of the intake duct 40 while fixing the movable member 61 fixed in the lock position.

Figure 11:
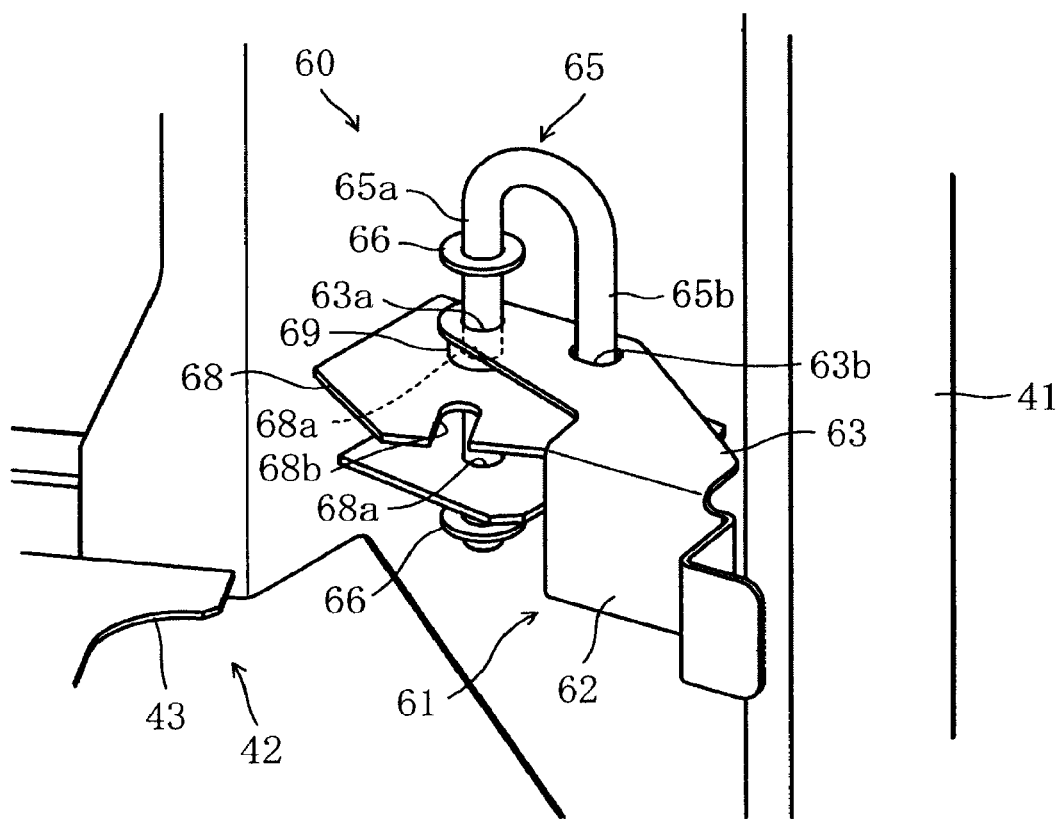
FIG. 11 is a perspective diagram showing a state where the lock member is in an unlock position.

For removal of the air filter 50 from the air filter holding section 42, firstly performed is, as shown in FIG. 11, operating the shaft member 65 so as to move the engagement shaft portion 65b of the shaft member 65 upward against the urging force caused by the compression spring 67. Specifically, the shaft member 65 is pulled up until the lower end of the engagement shaft portion 65b reaches a position higher than the upper surface of the retention member 68 to thereby release the engagement between the engagement shaft portion 65b and the engagement hole 68b. The release of the engagement allows the movable member 61 to make rotational movement. In this state, the movable member 61 is operated so as to make rotational movement about the center shaft portion 65a to reach the unlock position, thereby separating the lock plate 62 of the movable member 61 from the side wall surface of the air filter 50 on the rear side in the front-rear direction of the upper slewing body 20. The air filter holding unit 42 is thus opened rearward with respect to the front-rear direction of the upper slewing body 20, allowing the air filter 50 to be pulled out rearward in the front-rear direction of the upper slewing body 20 along the pair of guide plates 43 to be smoothly taken out through the maintenance hole 17.

Next will be described a second embodiment of the present invention with reference to FIG. 12 to FIG. 15.

Figure 12:
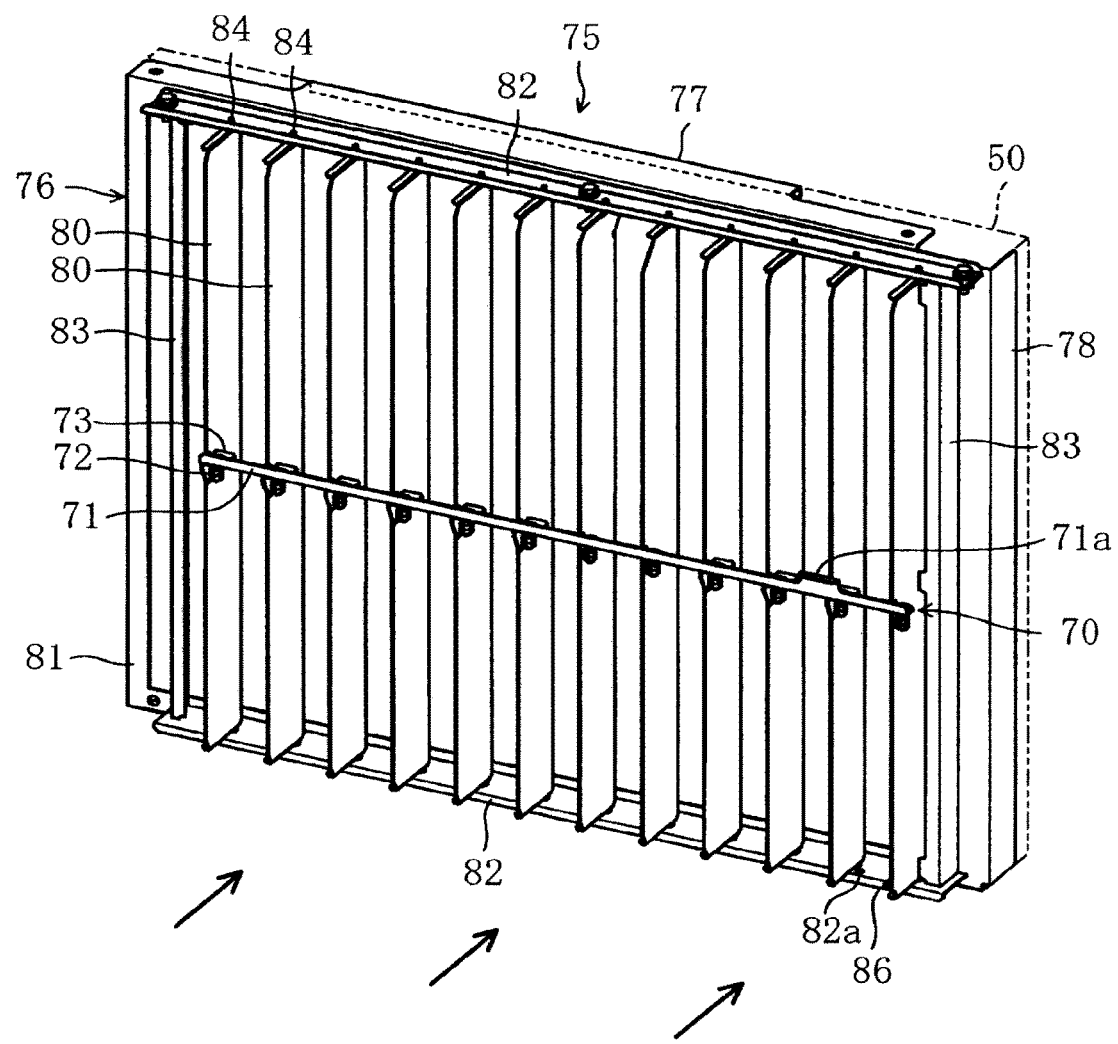
FIG. 12 is a perspective diagram of a case where the open/close members of the shut member according to the second embodiment of the present invention are in an open position.
Figure 13:
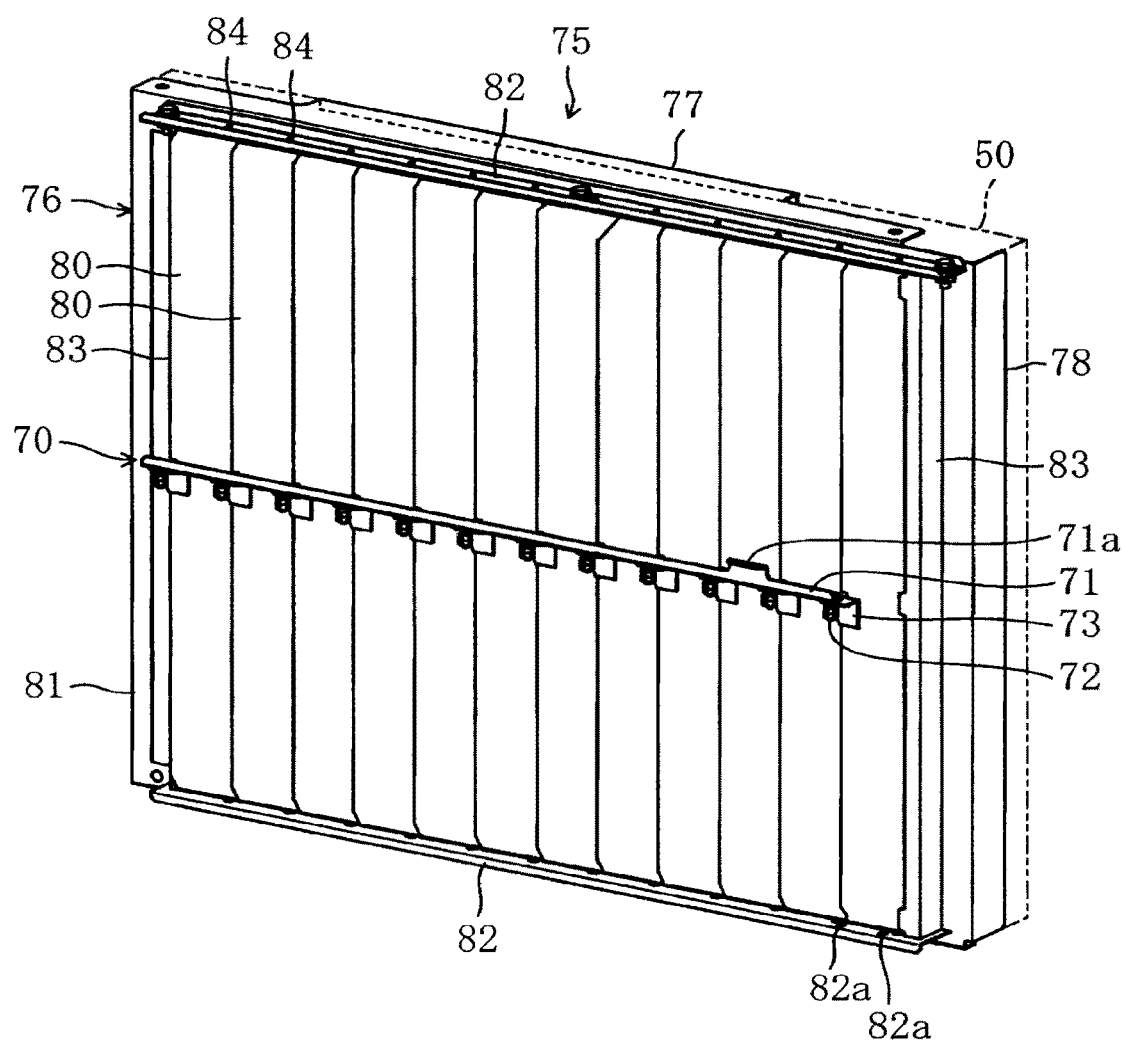
FIG. 13 is a perspective diagram of a case where the open/close members shown in FIG. 12 are in a close position.

The second embodiment also includes a shut member 75 as shown in FIG. 12 and FIG. 13. The shut member 75 includes a shut section 76, an engagement section 77 and a contact section 78.

The shut section 76 is to shut the filter surface of the air filter 50. The shut section 76 includes a frame portion 81 extending along the filter frame 51 of the air filter 50 to surround an opening, a plurality of open/close members 80 which cover the opening surrounded by the frame portion 81 so as to be able to open and close the opening, a pair of upper and lower support frames 82 which support the plurality of open/close members 80, a pair of connection frames 83 interconnecting the pair of support frames 82, and a switching section 70. The engagement section 77 projects towards the air filter 50 from the upper edge of the frame portion 81. The contact section 78 projects towards the air filter 50 from the side edge portion of the frame portion 81 on the rear side in the front-rear direction of the upper slewing body 20.

The pair of support frames 82 extend toward the upstream side in the air flow direction from the upper edge and lower edge of the frame portion 81, respectively. The connection frame 83 extends vertically so as to interconnect respective ends of the pair of support frames 82 in the front-rear direction of the upper slewing body 20 of the shut member 75.

Each of the open/close members 80 is plate-shaped members extending vertically. The plurality of open/close members 80 are spaced longitudinally, i.e., in the front-rear direction, of the upper slewing body 20, between the pair of support frames 82. The open/close members 80 are supported on the support frames 82 through a plurality of support axles 84 extending vertically across the pair of support frames 82, so as to be capable of rotational movement about the support axles 84, respectively. The rotational movement allows the open/close member 80 to be moved between a close position for shutting the filter surface of the air filter 50 as shown in FIG. 13 and an open position for opening the filter surface of the air filter 50 as shown in FIG. 12.

The switching section 70 makes an action for simultaneous switching of the plurality of open/close members 80 between their respective close positions and open positions. The switching section 70 includes a switching lever 71 extends in the front-rear direction of the upper slewing body 20 and is operated in the same direction, and a plurality of link axles 72 which move the open/close members 80 so as to link respective movements with the switching operation of the switching lever 71.

The switching lever 71 has an L-shaped cross-section including a horizontal plate portion and a projecting plate portion projecting upwards from the end of the horizontal plate portion on the rear side in the front-rear direction of the upper slewing body 20. The switching lever 71 includes a grip portion 71a projecting upward beyond the other portions at a position by the rear side of the upper slewing body 20 (the right side in FIG. 12) in the projecting plate portion. The grip portion 71a is a portion to be gripped by an operator in order to apply an operation to the switching lever 71 for making the switching lever 71 make the switching action, that is, sliding action longitudinal of the upper slewing body 20.

Each of the open/close members 80 has a link-axle support section 73 positioned in substantially the vertical center thereof. Each of the link axle support sections 73 integrally includes a vertical plate portion fixed to the surface of the corresponding open/close member 80 and a horizontal plate portion projecting, from the vertical plate portion, rearward in the front-rear direction of the upper slewing body 20, and the link axles 72 are mounted on the horizontal plate portions, respectively.

The switching lever 71 is thus connected to the open/close members 80 via the link axles 72 and the link axle support sections 73, respectively, and the link axles 72 constitute a link section which converts the switching action of the switching lever 71 into respective open/close actions of the open/close members 80. In other words, the switching lever 71 and the open/close members 80 are connected via the respective link axles 72 so as to cause the open/close members 80 to make simultaneous open and close actions in synchronization with the switching operation which is a sliding action of the switching lever 71 in the front-rear direction of the upper slewing body 20. Specifically, sliding of the switching lever 71 rearward with respect to the front-rear direction of the upper slewing body 20 causes the open/close members 80 to be moved to the open position shown in FIG. 12, and sliding of the switching lever 71 frontward with respect to the front-rear direction of the upper slewing body 20 causes the open/close members 80 to be moved to the close position shown in FIG. 13, in synchronization with each other.

The opening/closing action of the open/close members 80 makes it possible to select cooling/uncooling of the first to third heat exchangers 31, 32, 33 by the outside air. For example, shifting the open/close members 80 to the close position under cold conditions makes it possible to shut off the fluid flowing in the heat exchangers 31 to 33 from outside air to restrain them from overcooling. On the other hand, shifting the open/close members 80 to the open position under normal operation conditions in which it is not cold makes it possible to expose the first to third heat exchangers 31, 32, 33 to outside air to cool them effectively. In addition, respective open/close actions of the open/close members 80 are simultaneously achieved only by the simple operation of sliding the switching lever 71, which is connected to the open/close members 80 via respective link axles 72, in the front-rear direction of the upper slewing body 20.

Figure 14:
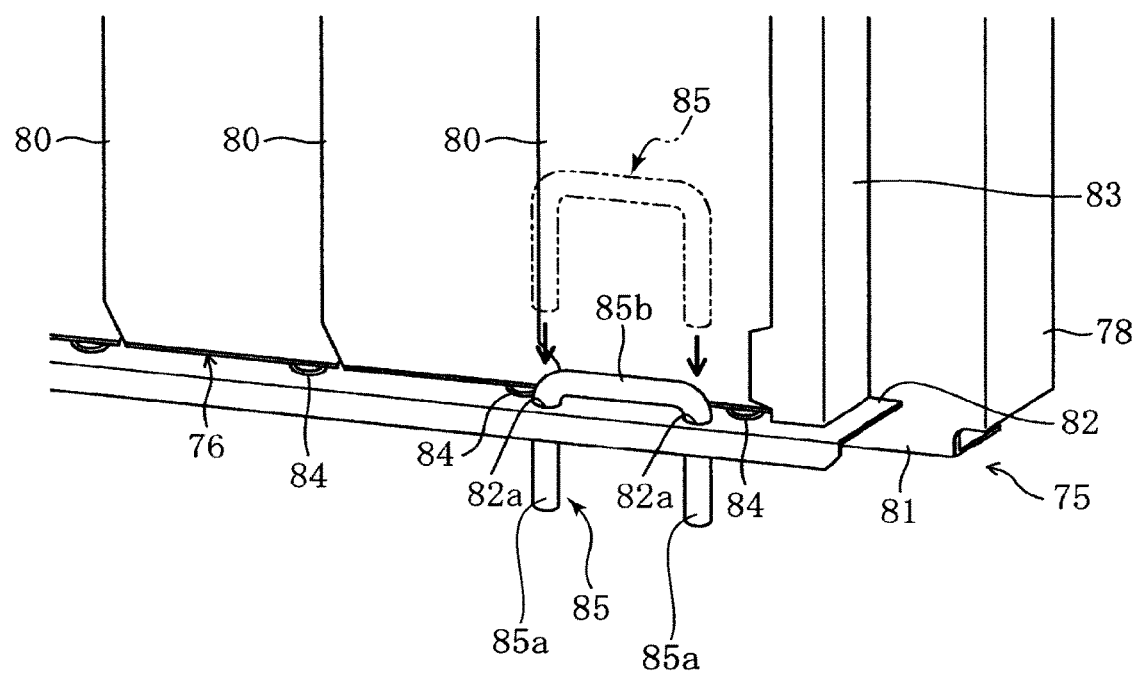
FIG. 14 is a perspective diagram showing a state of installation of a restriction member when the open/close members shown in FIG. 12 are in a close position.

The construction machine according to this second embodiment further includes the restriction member 85 shown in FIG. 14. The restriction member 85 is attachable and detachable with respect to the shut member 75, and can be switched to a state of being attached to the shut member 75 to restrict the open/close members 80 from their respective opening/closing actions and a state of being detached from the shut member 75 to permit the open/close members 80 to make respective opening/closing operations. Specifically, the restriction member 85 integrally includes a pair of spaced insertion shaft portions 85a and an interconnection shaft portion 85b interconnecting the pair of insertion shaft sections 85a. On the other hand, the lower-side support frame 82 is formed with two insertion holes 82a in respective positions by the rear side of the upper slewing body 20, spaced at an interval equal to the interval between the insertion shaft sections 85a in the front-rear direction of the upper slewing body 20, and the insertion shaft sections 85a can be inserted into the respective insertion holes 82a from above and removed upward therefrom.

The restriction member 85 can be attached to the support frame 82 by the insertion of the insertion shaft sections 85a into respective insertion holes 82a when the open/close members 80 are in the close position, and the thus attached restriction member 85 restricts the open/close members 80 from their respective movements to the open position by interfering with a part of the open/close members 80. Since the plurality of open/close members 80 are mutually connected through the switching lever 71, restricting any one open/close member 80 from its movement to the open position automatically involves respective restricts of the remaining open/close members 80 from their respective movements.

Figure 15:
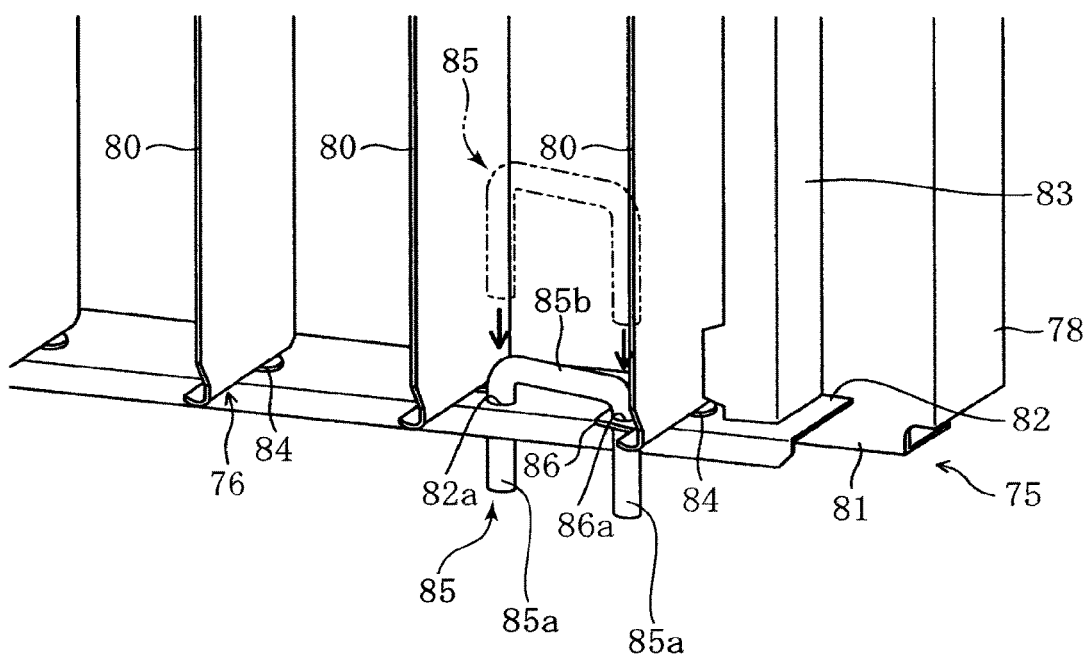
FIG. 15 is a perspective diagram showing a state of installation of a restriction member when the open/close members shown in FIG. 12 are in an open position.

As shown in FIG. 15, the open/close member 80 disposed in the vicinity of one of the pair of insertion holes 82a is provided with an extension portion 86 extending horizontally from the lower end of the open/close member 80. The extension portion 86 is formed with an engagement hole 86a. The engagement hole 86a is formed at a position allowing the two shaft portions 85a of the restriction member 85 to be inserted from above into the other of the pair of insertion holes 82a, and the engagement hole 86a, when the open/close members 80 are in the open position. The restriction member 85 attached to the shut member 75 by the insertion restricts the open/close member 80 provided with the extension section 86 from the movement from the open position to the close position. Since the plurality of open/close members 80 are connected to each other through the switching lever 71, restricting the open/close member 80 provided with the extension section 86 from the movement to the open position automatically involves respective restrictions of the remaining open/close members 80 from their movements to the open position.

As described above, the restriction member 85 can be attached to the shut member 75 to thereby prevent the open/close members 80 from accidental opening or closing due to vibrations, or the like, thus making it possible to avoid disabling the first to third heat exchangers 31, 32, 33 from being cooled or from being overcooled due to the open/close actions of the open/close members 80.

Next will be described a third embodiment of the present invention with reference to FIG. 16 to FIG. 21.

Figure 16:
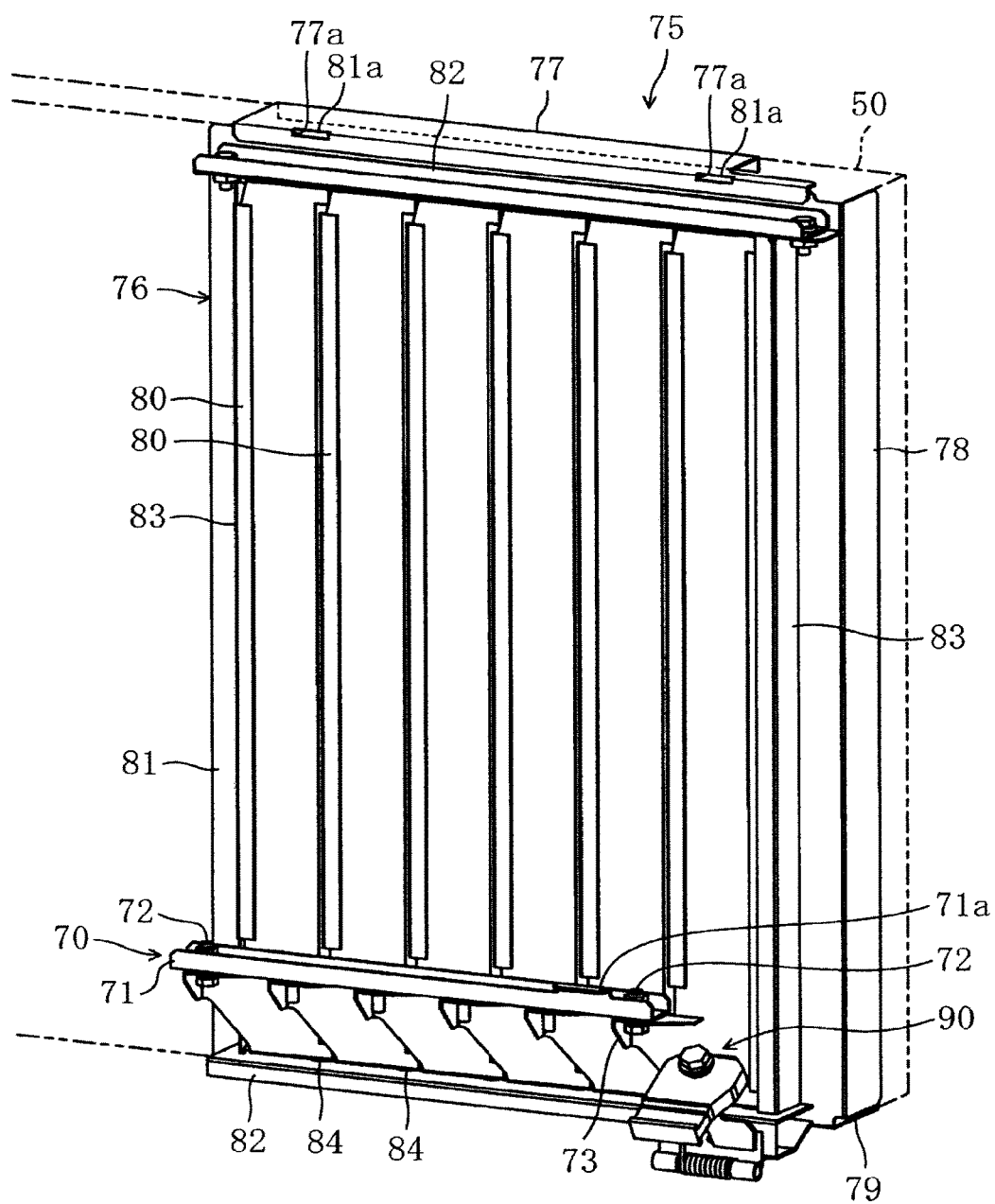
FIG. 16 is a perspective diagram of a case where the open/close members of the shut member according to the third embodiment of the present invention are in a close position.

FIG. 16 shows a shut member 75 relating to a third embodiment. The shut member 75 has a plurality of open/close members 80, similarly to the first and second embodiments, and FIG. 16 is a perspective diagram showing a state where the plurality of open/close members 80 are in their respective close positions. Below, parts which are the same as the second embodiment are labelled with the same reference numerals and only the points of difference are described.

Figure 18:
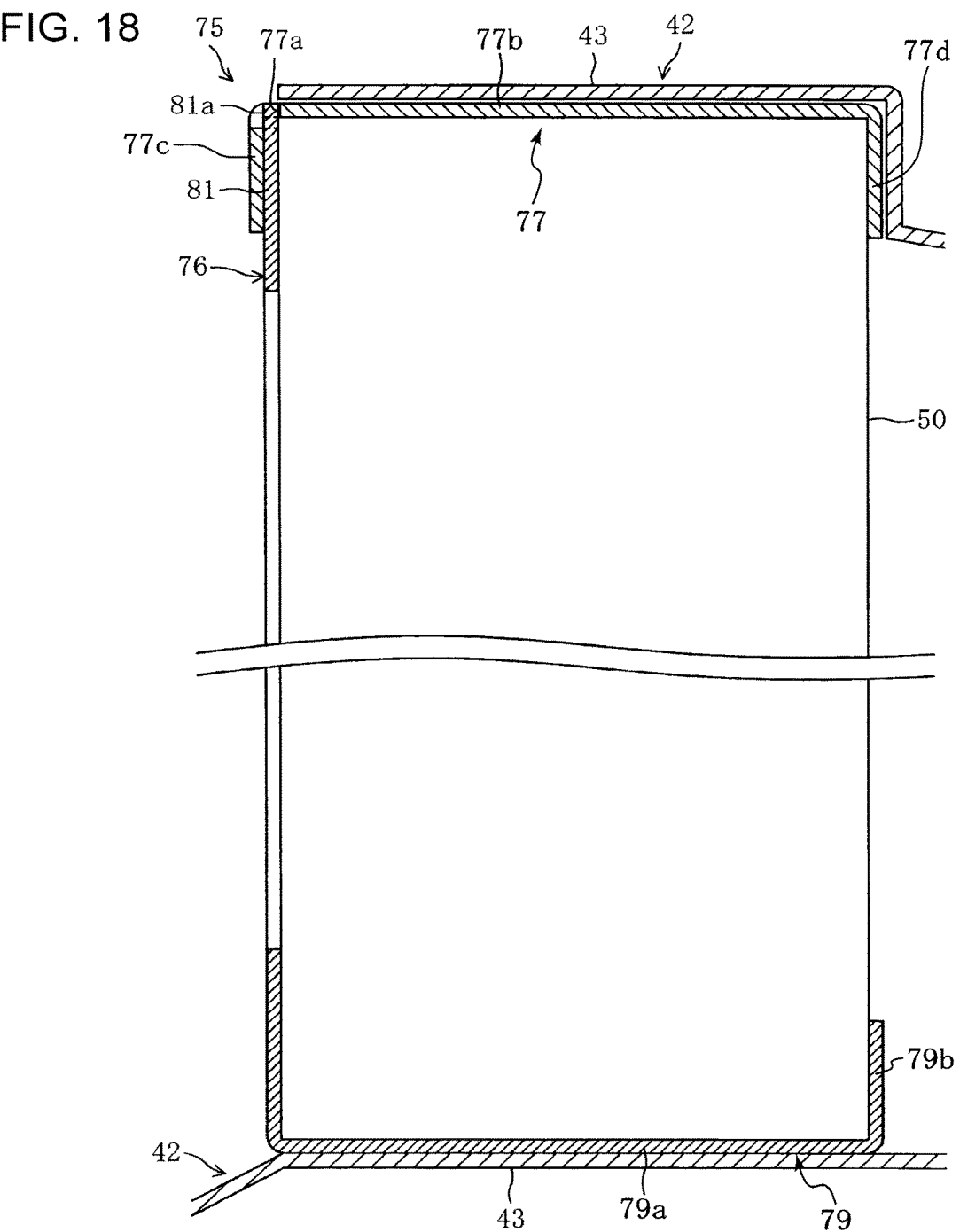
FIG. 18 is a lateral cross-sectional diagram showing a state where the air filter and the shut member are sandwiched between a pair of guide plates.

As shown in FIG. 16, the shut member 75 includes: a shut section 76 having a plurality of open/close members 80 and a frame portion 81 to shut the filter surface of an air filter 50; an engagement section 77 attachable and detachable with respect to the upper edge portion of the frame portion 81 of the shut section 76; a contact section 78 integrally connected with the side edge portion of the frame portion 81 of the shut section 76 on the rear side in the front-rear direction of the upper slewing body 20 and projecting from the side edge portion of the frame portion 81 toward the air filter 50, that is, rightward with respect to the right-left direction of the upper slewing body 20; and a support section 79. As shown in FIG. 18, the support section 79 integrally includes a main plate portion 79a integrally joined with the lower edge portion of the frame portion 81 of the shut section 76 and projecting from this lower edge portion toward the air filter 50, that is, rightward with respect to the right-left direction of the upper slewing body 20, and a projection plate portion 79b projecting upward from the right edge portion at the end of the main plate portion 79a, wherein the lower edge portion of the air filter 50 can be fitted in between the projection plate portion 79b and the frame portion 81.

Figure 17:
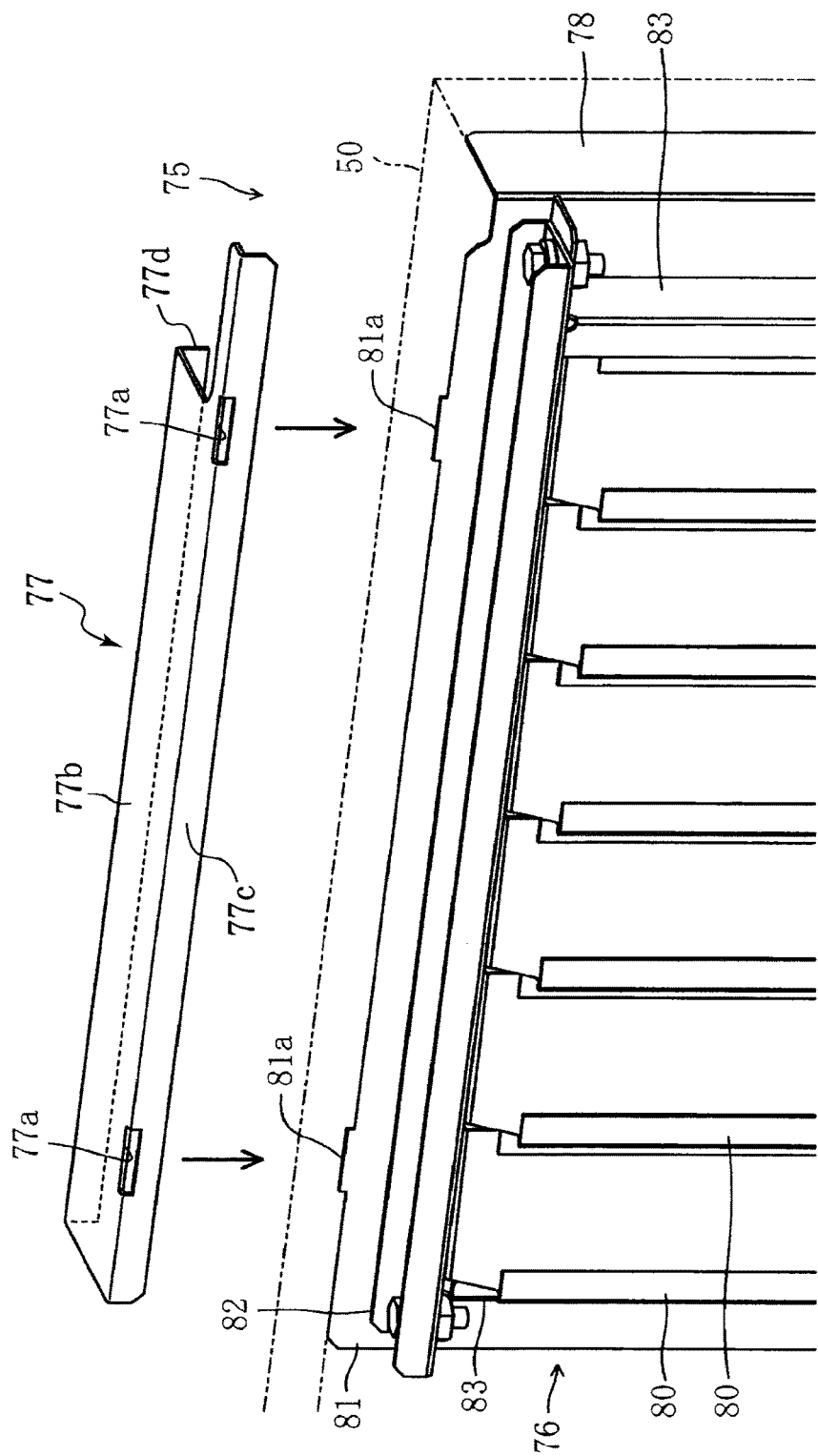
FIG. 17 is a perspective diagram showing a state where an engagement section has been removed from the shut section.

As shown in FIG. 17 and FIG. 18, the engagement section 77 integrally includes a top plate portion 77b and a pair of projecting plate portions 77c, 77d projecting downward from opposite edges of the top plate portion 77b with respect to the right-left direction of the upper slewing body 20 (from opposite edges in the thickness direction of the air filter 50), respectively, thus having a recess-shaped cross-section opened downward. The engagement section 77 can be formed of a single bent plate member. The engagement section 77 is formed with two through holes 77a spaced longitudinally of the upper slewing body 20, in the corner portion which is the boundary portion between the top plate portion 77b and the projecting plate portion 77c on the left side in the right-left direction.

The frame portion 81 of the shut section 76 is formed with two hook portions 81a projecting upward to be fitted into respective through holes 77a, in the upper edge part of the frame portion 81. Respective fits of the hook portions 81a into the through holes 77a of the engagement sections 77 allow the engagement sections 77 to be removably attached to the shut section 76. This involves a fit of the upper edge portion of the air filter 50 into the engagement sections 77 to cause the air filter 50 to be held between the engagement sections 77 and the support section 79, thereby allowing the air filter 50 to be reliably held. Desirably, each of the hook portions 81a has a height small enough to prevent the hook sections 81a from projecting upward beyond the upper surface of the ceiling plate portion 77b of the engagement section 77 when the hook portion 81a is fitted into the through hole 77a.

If the engagement section 77 were to be fixed to the frame portion 81 of the shut section 76, for example, by bolts, removal of the shut member 75 from the air filter 50 for maintenance would require a separate tool to loosen the bolts, involving substantial labor. In contrast, the above case where the shut member 75 is attached to the air filter 50 simply by fitting the hook portions 81a into the through holes 77a facilitates the attachment and detachment thereof, while generating a possibility of detachment of the shut member 75 from the air filter 50 accompany with an upward displacement of the engagement section 77 relative to the hook sections 81a. However, receiving the air filter 50 between the upper and lower pair of guide plates 43 while sandwiching it between the engagement section 77 of the shut member 75 and the support section 79, as shown in FIG. 18, enables the engagement section 77 to be restricted from upward displacement relative to the air filter 50 by the upper-side guide plate 43, thereby preventing the above detachment of the engagement section 77 from the frame portion 81.

Figure 19:
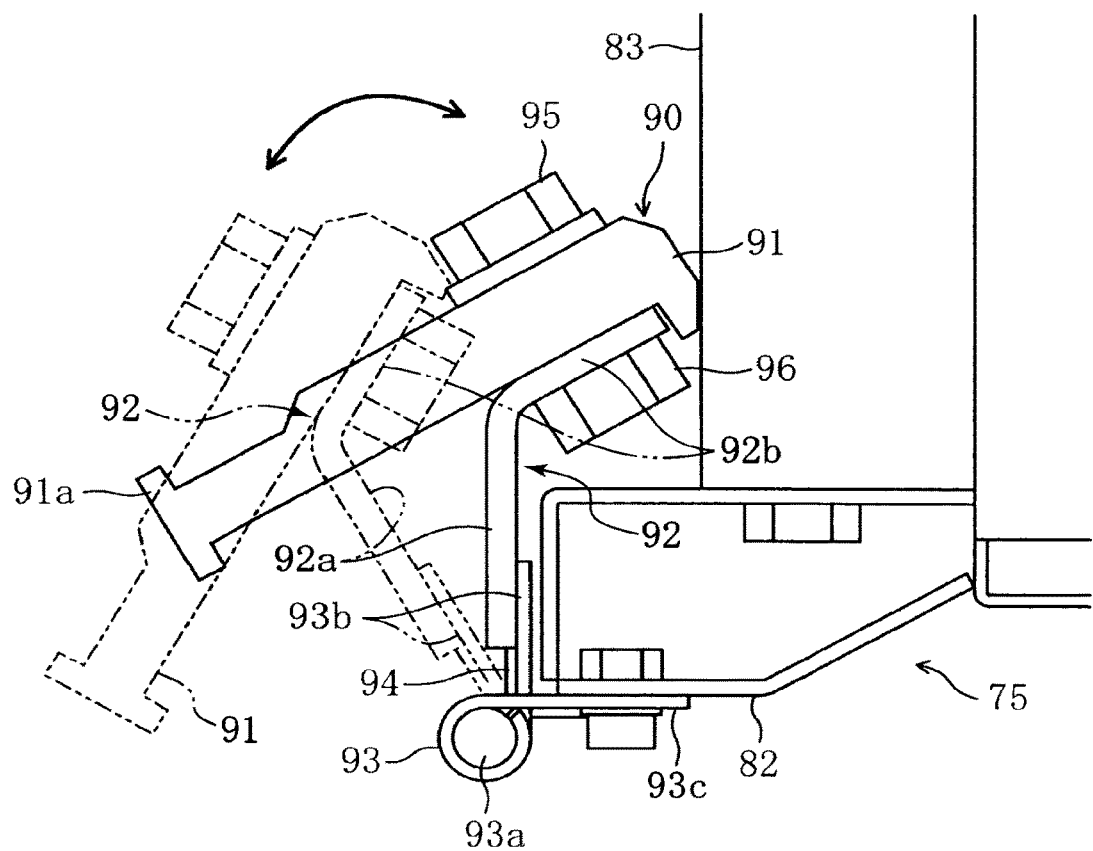
FIG. 19 is a side view diagram showing a configuration of a restriction member.
Figure 20:
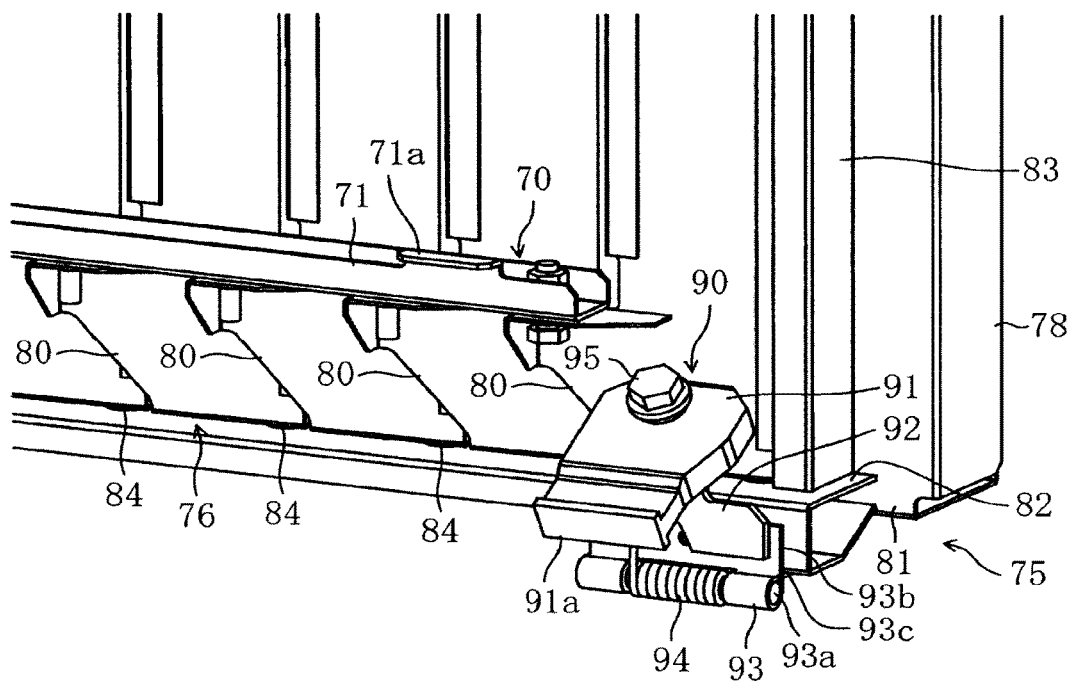
FIG. 20 is a perspective diagram showing a state of installation of a restriction member when the open/close members are in a close position.

The construction machine according to this third embodiment further includes the restriction member 90 shown in FIG. 19 and FIG. 20. The restriction member 90 is mounted on the lower support frame 82 in a part thereof by the rear side of the upper slewing body 20. The restriction member 90 includes a pressing section 91 which presses the open/close members 80, a support section 92 which supports the pressing section 91, a hinge section 93 interconnecting the support section 92 and the support frame 82 so as to allow the pressing section 91 and the support section 92 to make respective rotational movements relative to the support frame 82 about a hinge axle 93a extending longitudinally of the upper slewing body 20, and an urging spring 94 which urges the pressing section 91 in a direction toward the shut member 75.

The pressing section 91 is made of elastic body, such as rubber. The pressing section 91 includes a grip section 91a provided on the left end thereof in FIG. 19 to be gripped by the operator.

The support section 92 includes a base portion 92a connected to the hinge section 93 and an oblique portion 92b extending obliquely to the base portion 92a from the end of the base portion 92a opposite to the hinge section 93. When the pressing section 91 is pressed against the open/close members 80, the base portion 92a stands substantially upright from the hinge section 93 and the oblique portion 92b is inclined toward the open/close members 80 with respect to the base portion 92a. The support section 92 is formed of a single bent plate member. The pressing section 91 is placed on the upper surface of the oblique portion 92b, and is fastened removably to the oblique portion 92b with a fastening bolt 95 and a fastening nut 96.

The hinge section 93 includes the hinge axle 93a, a first hinge plate 93b and a second hinge plate 93c, which plates are capable of rotational movement relative to each other about the hinge axle 93a. The first hinge plate 93b is coupled to the base portion 92a of the support section 92, and the second hinge plate 93c is fixed to the lower surface of the support frame 82. The pressing section 91 and the support section 92 are, thus, supported on the support frame 82 so as to be capable of rotational movement about the hinge axle 93a in the right-left direction with respect to the support frame 82 in FIG. 19, integrally with the first hinge plate 93b.

The urging spring 94, formed of a torsion coil spring, is disposed in the periphery of the hinge axle 93a. The urging spring 94 has a first end portion and a second end portion. The first end portion makes contact with the inner surface of the first hinge plate 93b (the left side surface in FIG. 19) and the second end portion makes contact with the lower surface of the second hinge plate 93c. The torsional elastic force of the urging spring 94 urges the first hinge plate 93b and the support section 92 coupled thereto, in a direction in which the support section 92 approaches the shut member 75.

As shown in FIG. 20, when the plurality of open/close members 80 are in their close positions, the pressing section 91 of the restriction member 90 pressing a surface of a specific one of the plurality of open/close member 80 to restrict the open/close member 80 from movement toward the open position. Since the plurality of open/close members 80 are in connection with each other through the switching lever 71 as described above, the restriction of the specific open/close member 80 involves restrictions of respective movements of the other open/close members 80 to the open positions.

Figure 21:
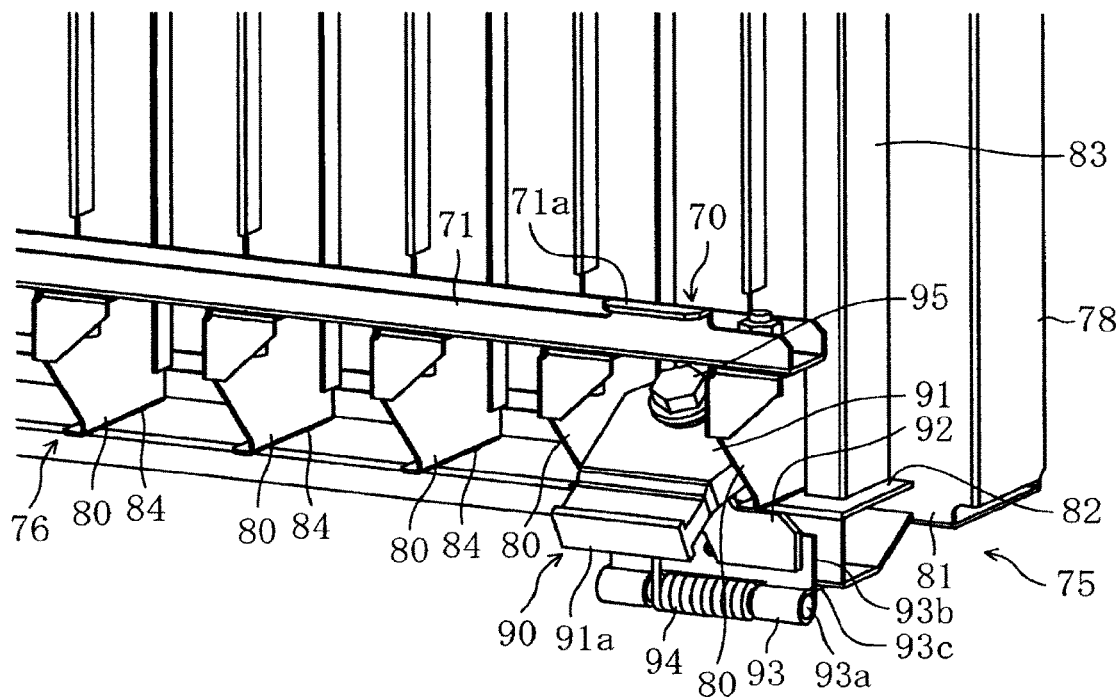
FIG. 21 is a perspective diagram showing a state of installation of a restriction member when the open/close members are in an open position.

As shown in FIG. 21, when the open/close members 80 are in their open positions, the pressing section 91 of the restriction member 90 fits in between the adjacent open/close members 80 and the side faces of the pressing section 91 come contact with respective surfaces of the open/close members 80, thereby restricting the open/close members 80 from movement toward the close position. Since the plurality of open/close members 80 are in connection with each other through the switching lever 71 as described above, the restriction of the specific open/close member 80 involves restriction of respective movements of the other open/close members 80 to the close positions.

The open/close actions of the open/close members 80 is permitted by pulling the pressing section 91 of the restriction member 90 away from the shut member 75 against the urging force of the urging spring 94 to release the restriction by the restriction member 90 and sliding the switching lever 71 while the restriction is thus released.

The present invention is not limited to the embodiments described above. The present invention also includes the following modes, for example.

The present invention involves no limitation of the core surface which overlaps with the shut section of the shut member. While the shut section 56 of the shut member 55 in the first embodiment is disposed so as to overlap with the core surface of the third heat exchanger 33 as viewed in the air flow direction in order to reduce the flow volume of outside air passing through the third heat exchanger 33 of the intercooler, the shut section 56 may be disposed so as to overlap, for example, not only with the third heat exchanger 33, but with the core surface of the second heat exchanger 32 of the oil cooler, or may be disposed so as to overlap with the core surfaces of all of the first to third heat exchangers 31, 32, 33. Alternatively, it is also possible to prepare a plurality of shut members 55 having different surface areas shutting the filter surfaces of the air filter 50 from each other. This makes it possible to adjust the cooling performance of the heat exchangers by change of the shut member 55 to be used in accordance with the outside air temperature in cold conditions to suitably change the flow surface area of the outside air in the air filter 50. Alternatively, in the case of arrangement of air filters 50 in respective two rows, namely, an upper and a lower row, it is possible to detachably install a plurality of shut members 55 corresponding to the upper and lower rows of the air filters 50 respectively. Respective shut sections 56 of the plurality of shut members 55 may have the same surface area as each other, or may have different surface areas from each other to enable the cooling performance to be adjusted.

The present invention involves no limitation of the specific structure for removable installation of the shut member on the air filter. While the shut member 55 in the first embodiment is installed removably on the air filter 50 by hook of the engagement section 57 of the shut member 55 onto the upper edge portion of the filter frame 51 of the air filter 50 to be and engaged therewith, the removal installation of the shut member 55 on the air filter 50 can be achieved also by, for example, providing the shut section 56 of the shut member 55 with a fit portion corresponding to the bellows shape of the filter section 52 of the air filter 50 and fitting the fit portion into the bellows portion of the filter section 52. Alternatively, it is also possible to form the engagement section 57 integrally with the shut section 56 so as to enable the engagement section 57 to engage with the side wall surface of the filter frame 51 on the rear side in the front-rear direction of the upper slewing body 20 and to form the contact section 58 integrally with the shut section 56 so as to enable the contact section 58 to make contact with the wall surface perpendicular to the surface with which the engagement section 57 engages, in other words, the upper surface of the filter frame 51. Thus formed contact section 58 can restrict the shut member 55 from downward movement.

In the case of the construction machine including open/close members, the open/close members only have to cover at least a part of the filter surface of the air filter in an openable and closable fashion. For instance, while the open/close members 80 according to the second embodiment cover the whole of the filter surface of the air filter 50 in an openable and closable fashion, the open/close members according to the present invention may be ones which cover only a part of the filter surface of the air filter 50 in an openable and closable fashion.

As described above, provided is a construction machine including a heat exchanger for cooling fluid which is a cooling object and being capable of suppressing overcooling of the fluid with only a small space requirement. The construction machine includes: a lower travel body; an upper slewing body mounted on the lower travel body and having an engine compartment; an engine compartment cover which covers the engine compartment of the upper slewing body; an air filter which collects dust included in outside air taken into the engine compartment and which has a filter surface; at least one heat exchanger disposed downstream of the air filter in an air flow direction and having a core surface; an air filter holding section which holds the air filter removably in an attitude which opposes the filter surface of the air filter to the core surface of the at least one heat exchanger; and a shut member which is installed removably on the air filter to shut at least a part of the filter surface of the air filter.

The shut member in this construction machine, installed removably on the air filter so as to shut at least a part of the filter surface of the air filter, is able to reduce the flow rate of air passing through the heat exchanger by reducing the surface area of the region, through which outside air passes, in the filter surface of the air filter. This suppresses overcooling of the coolant in the heat exchanger under cold conditions. Furthermore, in the case of additional installation of the shut member on an existing construction machine, the shut member can be incorporated into the construction machine through mounting the shut member removably on the air filter which has been removed. This facilitates the installation of the shut member and eliminates the need for creating a large space for installing the shut member.

Besides, if a plurality of shut members having different surface areas shutting the filter surface from each other, it is possible to change the shut member in accordance with the outside air temperature in cold conditions to thereby change the flow surface area of the outside area in the air filter, as appropriate, in other words, to adjust the cooling performance of the heat exchanger.

Desirably, the shut member has a shut section which shuts at least a part of the filter surface and an engagement section which is connected to the shut section and engages removably with an outer perimeter edge portion of the air filter. Engaging the engagement section with the outer perimeter edge portion of the air filter, for example, hooking the engagement section onto the upper edge portion of the air filter, allows the shut member to be easily and removably installed on the air filter. For example, it is possible to additionally install the shut member on an existing air filter easily, without any additional steps for forming screw holes in the air filter or the like.

The engagement section may be connected removably to the shut member. This makes it possible to install the shut member on the air filter by setting the shut section of the shut member, for example, at a prescribed relative position with respect to the air filter and then engaging the engagement section with the outer perimeter edge portion of the air filter, as well as connecting to the shut section, thereby allowing the ease of assembly to be improved.

Desirably, the air filter has an outer perimeter edge portion with an engagement surface which engages with the engagement section and a wall surface perpendicular to the engagement surface, and the shut member has a contact section which makes contact with the wall surface. For example, in the case where the engagement section of the shut member engages with the upper edge portion of the air filter, it is desirable that the contact section makes contact with a side wall surface of the air filter. The contact section can restrict the shut member from movement relative to the air filter in the direction perpendicular to the engagement surface, thereby facilitating positioning of the shut member with respect to the air filter.

In the case where the contact section makes contact with one of a first side wall surface and a second side wall surface which are directed widthwise of the air filter, it is preferable that the air filter holding section has a sandwiching section which makes contact with the first side wall surface and a lock member capable of movement between a lock position in which the lock member makes contact with the second side wall surface to thereby sandwich the air filter between the lock member and the sandwiching member and an unlock position in which the lock member separates from the second side wall surface to release the air filter from the sandwich and thereby allow the air filter to be taken out and the lock member holds the contact section together with the air filter between the sandwiching section and the lock member, in the lock position. The holding in sandwich eliminates the need for a special fixing tool for fixing the shut member to the air filter.

Desirably, the shut section of the shut member is disposed upstream of the air filter in the air flow direction in the air filter. The disposition enables the shut section to be pressed against the air filter by air flowing towards the air filter to make tight contact with the air filter, in other words, to reduce the gap between the shut section and the air filter.

Desirably, the at least one heat exchanger includes a plurality of heat exchangers aligned in a width direction along the filter surface of the air filter, one of the plurality of heat exchangers being an intercooler for cooling compressed air, the shut section of the shut member having a portion overlapping with at least a core surface of the intercooler as viewed in the air flow direction. The overlap suppresses overcooling of the compressed air of the intercooler. This makes it possible to suppress decrease in the temperature of the exhaust gas, for example, in a construction machine equipped with a diesel particulate filter (DPF), to thereby enable the DPF to be normally refreshed.

The shut section preferably includes at least one open/close member capable of movement between a close position in which the shut section shuts the filter surface and an open position in which the shut section opens the filter surface. The open/close member allows selective switching between permitting and prohibiting cooling of the heat exchanger by outside air to be made. Specifically, in cold conditions, shifting the open/close member to the close position makes it possible to shut off outside air to thereby suppress overcooling of the heat exchanger, and under normal operating conditions that are not cold, shifting the open/close member to the open position allows the heat exchanger to be exposed to outside air to be thereby cooled by the heat exchanger.

Desirably, the at least one open/close member includes a plurality of open/close members aligned in a direction along the filter surface, and the shut member further includes a switching section connected to each of the plurality of open/close members and synchronize the plurality of open/close members with each other so as to simultaneously switch the open/close members between the close position and the open position. The switching section enables the plurality of open/close members to be opened and closed in synchronization with each other, thereby eliminating the labor for individual respective open/close operations of the open/close members.

Desirably, the shut member further includes a restriction section switched between a state of restricting the at least one open/close member from movement between the open position and the close position and a state of permitting the movement. The restriction section, thus restricting the open/close members from movement in the open/close direction, can effectively restrict the open/close members from being closed unintentionally to disable the heat exchanger from being cooled, and/or can restrict the open/close members from being opened unintentionally due to vibrations or the like to permit overcooling.

This application is based on Japanese Patent application No. 2015-090090 and No. 2015-203129 filed in Japan Patent Office on Apr. 27, 2015 and Oct. 14, 2015, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:
1. A construction machine, comprising:
   a lower travel body;
   an upper slewing body mounted on the lower travel body and having an engine compartment;
   an engine compartment cover which covers the engine compartment of the upper slewing body;
   an air filter which collects dust included in outside air taken into the engine compartment and which has a filter surface;
   at least one heat exchanger disposed downstream of the air filter in an air flow direction and having a core surface;
   an air filter holding section which holds the air filter removably in an attitude which opposes the filter surface of the air filter to the core surface of the at least one heat exchanger; and
   a shut member which is installed removably on the air filter to shut at least a part of the filter surface of the air filter,
   wherein the shut member has a shut section which shuts at least a part of the filter surface and an engagement section which is connected to the shut section and engages removably with an outer perimeter edge portion of the air filter.

2. The construction machine according to claim 1, wherein the engagement section is connected removably to the shut section.

3. The construction machine according to claim 1, wherein the air filter has an outer perimeter edge portion with an engagement surface which engages with the engagement section and a wall surface perpendicular to the engagement surface, the shut member having a contact section which makes contact with the wall surface.

4. The construction machine according to claim 3, wherein:
   the contact section makes contact with one of a first side wall surface and a second side wall surface which are directed widthwise of the air filter;
   the air filter holding section has a sandwiching section which makes contact with the first side wall surface and a lock member capable of movement between a lock position in which the lock member makes contact with the second side wall surface to thereby sandwich the air filter between the lock member and the sandwiching member and an unlock position in which the lock member separates from the second side wall surface to release the air filter from the sandwich and thereby allow the air filter to be taken out; and
   the lock member holds the contact section together with the air filter between the sandwiching section and the lock member, in the lock position.

5. The construction machine according to any one of claim 1, wherein the shut section of the shut member is disposed upstream of the air filter in the air flow direction of the air filter.

6. The construction machine according to any one of claim 1, wherein:
   the at least one heat exchanger includes a plurality of heat exchangers aligned in a width direction along the filter surface of the air filter;
   one of the plurality of heat exchangers is an intercooler for cooling compressed air; and
   the shut section of the shut member has a portion overlapping with at least a core surface of the intercooler as viewed in the air flow direction.

7. The construction machine according to any one of claim 1, wherein the shut section has at least one open/close member capable of movement between a close position in which the shut section shuts the filter surface and an open position in which the shut section opens the filter surface.

8. The construction machine according to claim 7, wherein the at least one open/close member includes a plurality of open/close members aligned in a direction along the filter surface, and the shut member further includes a switching section which is connected to each of the plurality of open/close members and synchronizes the plurality of open/close members with each other so as to simultaneously switch the open/close members between their respective close positions and their respective open positions.

9. The construction machine according to claim 8, wherein the shut member further includes a restriction section which is switched between a state of restricting the at least one open/close member from movement between the open position and the close position and a state of permitting the movement.

* * * * *